(12) United States Patent
Zhang

(10) Patent No.: US 10,624,036 B2
(45) Date of Patent: *Apr. 14, 2020

(54) METHOD AND DEVICE IN UE AND BASE STATION USED FOR LOW LATENCY COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/261,508

(22) Filed: Jan. 29, 2019

(65) Prior Publication Data

US 2019/0159137 A1 May 23, 2019

Related U.S. Application Data

(63) Continuation of application No. PCT/CN2017/094637, filed on Jul. 27, 2017.

(30) Foreign Application Priority Data

Jul. 31, 2016 (CN) .......................... 2016 1 0615909
Aug. 2, 2016 (CN) .......................... 2016 1 0621127

(51) Int. Cl.
*H04W 52/14* (2009.01)
*H04W 52/32* (2009.01)
*H04W 52/36* (2009.01)

(52) U.S. Cl.
CPC ....... *H04W 52/146* (2013.01); *H04W 52/325* (2013.01); *H04W 52/367* (2013.01)

(58) Field of Classification Search
None
See application file for complete search history.

(56) References Cited

U.S. PATENT DOCUMENTS

2005/0207341 A1* 9/2005 Zhang ..................... H04L 5/023
370/232
2010/0113004 A1* 5/2010 Cave ..................... H04L 5/0053
455/422.1

(Continued)

FOREIGN PATENT DOCUMENTS

CN 103889041 A 6/2014
WO 2011/120716 A1 10/2011

OTHER PUBLICATIONS

PCT International Search Report and Written Opinion issued in corresponding application No. PCT/CN2017/094637, dated Oct. 18, 2017 (partial translation).

*Primary Examiner* — Lana N Le
(74) *Attorney, Agent, or Firm* — Maschoff Brennan

(57) ABSTRACT

A method and device in a User Equipment (UE) and a base station low latency communication are disclosed. UE determines a first power, and transmits a first radio signal with the first power on a first carrier, and determines R power value(s), and transmits R low latency radio signal(s) on a second carrier with the R power value(s) respectively. When the first power and the R power value(s) have a value of zero, the UE drops the corresponding radio signals transmission. The present disclosure, according to carrying information of the first radio signal and the R low latency radio signal value(s) respectively, and time domain relations of occupied time intervals, determines the first power and the R power value(s), and then in a scenario that the UE supports both low latency communication and carrier aggregation, properly configures transmission powers of different carriers, and guarantees correct reception of uplink channels.

12 Claims, 5 Drawing Sheets

(56) References Cited

U.S. PATENT DOCUMENTS

| | | | | |
|---|---|---|---|---|
| 2010/0304694 | A1* | 12/2010 | Suzuki | H03F 1/3247 |
| | | | | 455/114.3 |
| 2011/0281525 | A1* | 11/2011 | Furuskar | H04B 17/391 |
| | | | | 455/67.11 |
| 2013/0012255 | A1* | 1/2013 | Kim | H04W 52/42 |
| | | | | 455/522 |
| 2018/0014254 | A1* | 1/2018 | Hwang | H04W 52/146 |
| 2018/0014262 | A1* | 1/2018 | Lee | H04W 52/346 |
| 2018/0132189 | A1* | 5/2018 | Sundararajan | H04W 52/50 |
| 2018/0242264 | A1* | 8/2018 | Pelletier | H04W 52/146 |
| 2018/0279339 | A1* | 9/2018 | Lohr | H04W 72/1268 |
| 2019/0007910 | A1* | 1/2019 | Akula | H04W 52/346 |
| 2019/0159144 | A1* | 5/2019 | Zhang | H04W 52/325 |
| 2019/0174432 | A1* | 6/2019 | Wang | H04L 5/0048 |
| 2019/0215781 | A1* | 7/2019 | Jeon | H04W 24/10 |
| 2019/0230607 | A1* | 7/2019 | Chung | H04W 52/14 |
| 2019/0261424 | A1* | 8/2019 | Park | H04W 72/085 |
| 2019/0313436 | A1* | 10/2019 | Lee | H04L 5/0007 |

* cited by examiner

METHOD AND DEVICE IN UE AND BASE STATION USED FOR LOW LATENCY COMMUNICATION

CROSS REFERENCE TO RELATED APPLICATION

This application is a continuation-in-part of International Application No. PCT/CN2017/094637, filed Jul. 27, 2017, claiming the priority benefit of Chinese Patent Application Serial Number 201610615909.7, filed on Jul. 31, 2016, and Chinese Patent Application Serial Number 201610621127.4, filed on Aug. 2, 2016, the full disclosure of which is incorporated herein by reference.

BACKGROUND

Technical Field

The present disclosure relates to transmission schemes of radio signals in wireless communication systems, and in particular to a method and a device for low latency communication.

Related Art

In existing Long-term Evolution (LTE) and Long-Term Evolution Advanced (LTE-A) systems, Transmission Time Interval (TTI) or subframe or Physical Resource Block (PRB) pair corresponds to a milli-second (ms) in time. A LTE subframe comprises two time slots, a first time slot and a second time slot respectively, the first time slot and the second time slot occupy a first half ms and a second half ms of a LTE subframe respectively.

Traditional LTE system, when bring in a Carrier Aggregation (CA) scheme, to guarantee Uplink Control Information (UCI) receives correctly on a base station side, defines a relevant strategy of power scaling. The concrete manner is: when there are multiple carriers transmitting at the same time, a carrier of transmitting Physical Uplink Control Channel (PUCCH) has a higher priority than a carrier transmitting Physical Uplink Shared Channel (PUSCH) in terms of power allocation; and a carrier of transmitting UCI-included PUSCH is greater than a carrier of transmitting UCI-excluded PUSCH in terms of power allocation priority.

For Release 14 Reduced Latency and New Radio access technologies (NR) in 3rd Generation Partner Project (3GPP), an important scenario is Ultra-Reliable and Low Latency Communications (URLLC). Targeting Reduced Latency and URLLC scenario, a new time interval, i.e. Short Transmission Time Interval (sTTI) has been introduced, a corresponding traditional power scaling method needs to be redesigned.

SUMMARY

Researchers found, when using sTTI with different duration on multiple carriers for uplink transmission, a long sTTI data transmission might target multiple short sTTI transmissions, and in the multiple short sTTI transmissions, some are uplink control channels, some are UCI-included data channels, and remainings are pure uplink data channels, and this channel combination can dynamically vary. Therefore, power selection used for the long sTTI transmission via a traditional power scaling method becomes a problem.

In a straightforward way, a maximum transmission power supported by a UE is equally shared by two carriers. However, one of the most obvious problems of this method is that it will reduce a transmission power of an uplink control channel, which will affect an uplink control channel performance.

In view of the above design, the present disclosure provides a solution. The embodiments of the UE of the present disclosure and the characteristics in the embodiments may be applied to the base station, and vice versa, if no conflict is caused. The embodiments of the present disclosure and the characteristics in the embodiments may be arbitrarily and mutually combined if no conflict is caused.

The present disclosure provides a method in UE for low latency communication, comprising:

determining a first power, transmitting a first radio signal with a first power on a first carrier;

determining R power value(s), transmitting R low latency radio signal(s) on a second carrier with the R power value(s) respectively;

wherein the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one embodiment, in traditional LTE and LTE-A system, power scaling is based on each Subframe (SF), and on different carriers, UE will only transmit one physical layer channel in one subframe. When UE supports sTTI and CA at the same time, and when a configuration of sTTI on each carrier is different, in one subframe, UE may transmit different uplink channels on different sTTI, and a long sTTI of a carrier will correspond to a short sTTI carrying multiple different physical layer channels on another carrier. Traditional power scaling method will not be adapted.

In one embodiment, the above methods in this present design according to carrying information of the first radio signal and the R low latency radio signal value(s), time-domain relations of occupied time intervals, determine the first power and the R power value(s), and then in a scenario that the UE supports both low latency communication and carrier aggregation, properly configure transmission powers of different carriers, guarantee uplink channels, especially receive performance of uplink channels carrying control information, improve an overall performance of a system.

In one embodiment, in the above method the target time interval set is used to determine observation windows of the first power and the R power value(s).

In one embodiment, in the above method the first time interval is a time interval at which the second power takes effect.

In one embodiment, transmitting a given radio signal with a given power is: if the given power is greater than 0, transmitting the given radio signal, a transmission power of the given radio signal is the given power; if the given power is 0, dropping the given radio signal transmission.

In one embodiment, the first power is greater than 0, the phrase that transmitting a first radio signal with a first power on a first carrier means: transmitting the first radio signal, a transmission power of the first radio signal is the first power.

In one embodiment, the first power is equal to 0, the phrase that transmitting a first radio signal with a first power on a first carrier means: dropping a first radio signal transmission on a first carrier.

In one embodiment, the R power value(s) is(are) greater than 0, the phrase that transmitting R radio signal(s) with R power value(s) on a second carrier means: transmitting R low latency radio signal(s) with the R power value(s) on a second carrier.

In one embodiment, the R power value(s) is(are) equal to 0, the phrase that transmitting R radio signal(s) with R power value(s) on a second carrier means: dropping R low latency radio signal(s) transmission on a second carrier.

In one embodiment, R1 power value(s) of the R power value(s) is(are) greater than 0, R2 power value(s) of the R power value(s) is(are) equal to 0, the phrase that transmitting R radio signal(s) with R power value(s) on a second carrier is: dropping R low latency radio signal(s) transmission on a second carrier, transmitting R1 low latency radio signal(s) on a second carrier, transmission power(s) of the R1 low latency radio signal(s) is(are) the R1 power value(s) respectively, the R is equal to a sum of the R1 and the R2, the R1 low latency radio signal(s) and the R2 low latency radio signal(s) constitute the R low latency radio signals. The R1 and the R2 are positive integers less than the R, respectively.

In one embodiment, the L time intervals are continuous.

In one embodiment, the L time intervals locate within 1 subframe.

In one embodiment, the L time intervals locate within 1 millisecond.

In one embodiment, the L time intervals locate within 0.5 millisecond.

In one embodiment, at least two time intervals within the L time intervals are different in time duration.

In one embodiment, time duration of the L time intervals is same.

In one embodiment, the L1 is equal to the L.

In one embodiment, the L1 is less than the L, time duration of the L1 time interval(s) is same.

In one embodiment, the L1 is configurable.

In one embodiment, the L1 is determined by default.

In one embodiment, the L1 is determined by the UE itself

In one embodiment, at least two time intervals within the L1 time intervals are different in time duration.

In one embodiment, the L1 time intervals are same in duration time.

In one embodiment, the R time interval(s) is(are) continuous on time-domain.

In one embodiment, at least two of the R time intervals are different in time duration.

In one embodiment, the R time intervals are same in time duration.

In one embodiment, the time interval occupies a positive integer number of multicarrier symbols in a time-domain; the positive integer is equal to 1, or the positive integer is equal to 2, or the positive integer is equal to 4, or the positive integer is equal to 7.

In one embodiment, time resources occupied by the R low latency radio signal(s) are configured by a downlink signaling.

In one embodiment, a physical layer channel occupied by the first UCI is a physical layer control channel other than PUCCH format 1, or a physical layer channel occupied by the first UCI is a physical layer control channel other than PUCCH format 1a, or a physical layer channel occupied by the first UCI is a physical layer control channel other than PUCCH format 1b, or a physical layer channel occupied by the first UCI is a physical layer control channel other than PUCCH format 2.

In one embodiment, the Resource Unit (RU) in the present is a minimum unit of resources allocation; the RU occupies a multi-carrier symbol on time-domain, occupies a subframe on frequency domain.

In one embodiment, the RU in the present is a Resource Element (RE) of LTE.

In one embodiment, the multi-carrier symbol in the present is an Orthogonal Frequency Division Multiplexing (OFDM) symbol comprising Cyclic Prefix (CP), or the multi-carrier symbol in the present is a Discrete Fourier Transform Spreading OFDM (DFT-s-OFDM) symbol comprising CP, or the multi-carrier symbol in the present is a Single-Carrier Frequency Division Multiple Access (SC-FDMA) symbol, or the multi-carrier symbol in the present is a Filter Bank Multi Carrier (FBMC) symbol.

In one embodiment, the multi-carrier symbol in the present is a SC-FDMA symbol of uplink in LTE.

In one embodiment, a given radio signal carries a given bit block is: the given radio signal is obtained after the given bit block experiences channel coding, modulation mapper, layer mapper, precoding, resource element mapper, and generation of multicarrier symbols.

In one embodiment, a given radio signal carries a given bit block is: the given bit block is used to generate the given radio signal.

In one embodiment, the first bit block is a Transport Block (TB).

In one embodiment, the first bit block comprises two TBs.

In one embodiment, the first UCI comprises Hybrid Automatic Repeat request Acknowledgment (HARQ-ACK), at least one of Channel State Information (CSI) and Scheduling Request (SR).

In one subembodiment, the HARQ-ACK indicates whether a relevant TB is decoded correctly.

In one embodiment, the first bit block and the first UCI are both transmitted by a first physical layer data channel.

In one embodiment, the first bit block is transmitting on a first physical layer data channel, the first UCI is transmitted by a first physical layer control channel.

In one subembodiment of the above two embodiments, the first physical layer data channel is PUSCH, the first physical layer control channel is PUCCH.

In one subembodiment of the above two embodiments, the first physical layer data channel is Short TTI PUSCH (sPUSCH), the first physical layer control channel is Short TTI PUCCH (sPUCCH).

In one subembodiment of the above two embodiments, a length of a sTTI corresponding to the first physical layer data channel is 0.5 milliseconds.

In one subembodiment of the above two embodiments, the first UCI is HARQ-ACK, a length of a sTTI corresponding to the first UCI is 0.5 milliseconds.

In one embodiment, the low latency UCI comprises at least one of HARQ-ACK, CSI and SR.

In one embodiment, the low latency UCI is HARQ-ACK.

In one embodiment, the low latency bit block is a TB.

In one embodiment, the low latency bit block comprises two TBs.

In one embodiment, for a given low latency radio signal, the low latency bit block and the low latency UCI are both transmitting on a first physical layer data channel.

In one embodiment, for a given low latency radio signal, the low latency bit block is transmitting on a second physical layer data channel, the low latency UCI is transmitting on a second physical layer control channel.

In one subembodiment of the above two embodiments, the second physical layer data channel is sPUSCH, the second physical layer control channel is sPUCCH.

In one subembodiment of the above two embodiments, a length of a sTTI corresponding to the second physical layer data channel is less than or equal to 0.5 milliseconds.

In one subembodiment of the above two embodiments, a length of a sTTI corresponding to the second physical layer control channel is less than or equal to 0.5 milliseconds.

In one embodiment, the first power and the second power are linear respectively.

In one embodiment, units of the first power and the second power are watt respectively.

In one embodiment, units of the first power and the second power are milliwatt respectively.

In one embodiment, units of the first power and the second power are dBm respectively.

In one embodiment, the above operation "determining a first power, transmitting a first radio signal with a first power on a first carrier" and the above operation "determining R power value(s), transmitting the R low latency radio signal(s) with the R power value(s) on a second carrier respectively" are performed by the user equipment at the same time.

In one embodiment, a starting time of the above operation "determining a first power, transmitting a first radio signal with a first power on a first carrier" occurs earlier than a starting time of the above operation "determining R power value(s), transmitting the R low latency radio signal(s) with the R power value(s) on the second carrier".

In one embodiment, a duration of the above operation "determining a first power, transmitting a first radio signal with a first power on a first carrier" and a duration of the above operation "determining R power value(s), transmitting the R low latency radio signal(s) with the R power value(s) on the second carrier respectively" are overlap in a time-domain.

According to an aspect of the present, wherein at least the first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted by a physical layer data channel, the low latency UCI is transmitted by a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the UE on the first time interval on carrier(s) other than the first carrier and the second carrier;

In one embodiment, the characteristics of the above method are, a priority of the first radio signal is lower than a priority of the given low latency radio signal, the low latency radio signal preferentially allocates a transmission power to guarantee receiving performance of the low latency radio signal.

In one embodiment, a physical layer channel corresponding to the first radio signal is a UCI-excluded PUSCH or a UCI-excluded sPUSCH, and a physical layer channel corresponding to the low latency radio signal is a UCI-included PUSCH or a UCI-included sPUSCH.

In one embodiment, a physical layer channel corresponding to the first radio signal is a UCI-excluded PUSCH or a UCI-excluded sPUSCH, and a physical layer channel corresponding to the low latency radio signal is a PUCCH or a sPUCCH.

In one embodiment, a physical layer channel corresponding to the first radio signal is a UCI-included PUSCH or a UCI-included sPUSCH, and a physical layer channel corresponding to the low latency radio signal is a PUCCH or a sPUCCH.

In one embodiment, the given radio signal carries a given first information is: the given first information is used to generate the given radio signal.

In one subembodiment, a target information is used to generate the given radio signal, the target information is information other than the given first information.

In one embodiment, a given radio signal carries a given first information is: the given radio signal at least carries the given first information.

In one embodiment, a given radio signal carries a given first information of a given first information and a given second information is: the given radio signal carries the given first information, and the given radio signal does not carry the given second information.

In one embodiment, the UE transmits a radio signal only on the first carrier and the second carrier in the given time interval, the third power is the maximum transmission power.

In one embodiment, the first ideal power is invariant.

In one embodiment, the first ideal is generated in a predefined method.

In one embodiment, the first ideal power is configurable.

In one embodiment, the first ideal power and the given time interval are related to at least one of a given subframe position and a given subframe position. Wherein the given subframe is a subframe of the given time interval, a given radio frame is a radio frame occupied by the given subframe.

In one embodiment, the first ideal power is related to the kind of physical layer channel corresponding to the first radio signal.

In one embodiment, the UE transmits uplink physical layer signaling on M carriers in the first time interval; the M carriers comprise the first carrier and the second carrier, subscripts 3 to M for the remaining carriers other than the first carrier and the second carrier among the M carriers; the j indicates a position number of the first time interval in a given subframe. The given subframe is a subframe occupied by the first time interval; the M is a positive integer not less than 2.

In one subembodiment, a physical layer channel corresponding to the first low latency radio signal is PUCCH or sPUCCH, the PUCCH uses one of PUCCH Format 1, PUCCH Format 1a, PUCCH Format 1b, PUCCH Format 2, PUCCH Format 2a, PUCCH Format 2b and PUCCH Format 3; or the sPUCCH uses one of PUCCH Format 1, PUCCH Format 1a, PUCCH Format 1b, PUCCH Format 2, PUCCH Format 2a, PUCCH Format 2b and PUCCH Format 3; the second power $P_2(j)$ meets the following formula:

$$P_2(j) = \min\begin{cases} P_{CMAX,C_2}(j), \\ P_{0\_PUCCH} + PL_{C_2} + h(n_{CQI}, n_{HARQ}, n_{SR}) + \Delta_{F\_PUCCH}(F) + \\ \Delta_{TxD}(F') + g(j) \end{cases}$$

wherein the second carrier is indexed by a subscript $C_2$, $P_{CMAX,C_2}(j)$ is a configuration power of the UE on a second carrier, and linearly related to the maximum transmission power supported by the UE, the $\Delta_{F\_PUCCH}(F)$ and $\Delta_{TxD}(F')$ is configured by high level signaling, $h(n_{CQI}, n_{HARQ}, n_{SR})$ is related to the PUCCH Format used by the first low latency radio signal, $P_{0\_PUCCH}$ related to high level signaling configuration, $PL_{C_2}$ corresponding to the path loss of the UE on the second carrier, $g(j)$ related to Transmission Power Control (TPC); the specific meaning can be found in 3GPP Technical Specification (TS) 36.213, chapter 5.1.

In one subembodiment, a physical layer channel corresponding to the first low latency radio signal is PUCCH or sPUCCH, the PUCCH uses one of PUCCH Format 4 and PUCCH Format 5; or the sPUCCH uses one of PUCCH Format 4 and PUCCH Format 5; the second power $P_2(j)$ meets the following formula:

$$P_2(j) = \min\begin{cases} P_{CMAX,C_2}(j), \\ P_{0\_PUCCH} + PL_{C_2} + 10\log_{10}(M_{PUCCH,C_2}(j)) + \Delta_{TF,C_2}(j) + \\ \Delta_{F\_PUCCH}(F) + g(j) \end{cases}$$

wherein the second carrier is indexed by a subscript $C_2$, $M_{PUCCH,C_2}(j)$ indicates the number of Physical Resource Block (PRB) pairs occupied by the low latency radio signal, $\Delta_{TF,C_2}(j)$ is related to the number of bits occupied by the first low latency radio signal, the specific meaning can be found in 3GPP Technical Specification (TS) 36.213, chapter 5.1.

In one subembodiment of the above two embodiments, among the remaining carriers, there is an uplink signal carrying UCI transmitted by each of Y carrier(s), and the first radio signal does not carry UCI; or there is a PUCCH or a sPUCCH transmitted by each of Y carrier(s), and the first low latency radio signal corresponds to PUSCH and sPUSCH. A sum of a corresponding a transmission power on the Y carriers is equal to $$\sum_{y \in Y} P_y(j).$$

The Y is less than or equal to (M−2). The first ideal power $P_1^{Ideal}(j)$ meets the following formula:

$$P_1^{Ideal}(j) = \min\begin{cases} 10\log_{10}(\hat{P}_{CMAX,C_1}(j)), \\ 10\log_{10}(M_{PUSCH,C_1}(j)) + P_{0\_PUSCH,C_1}(j) + \alpha_{C_1}(j) \cdot \\ PL_{C_1} + \Delta_{TF,C_1}(j) + f_{C_1}(j) \end{cases}$$

wherein the second carrier is indexed by a subscript $C_2$, $M_{PUSCH,C_1}(j)$ is related to the number of PRB pairs occupied by the first radio signal in the frequency domain, $P_{O\_PUSCH,C_1}(j)$, $\Delta_{TF,C_1}(j)$ and $\alpha_{C_1}(j)$ are related to a high level signaling configuration, $f_{C_1}(j)$ is related to TPC. The specific meaning can be found in 3GPP Technical Specification (TS) 36.213, chapter 5.1.

As an example of the subembodiment, the fourth power is equal to $$\sum_{y \in Y} P_y(j)$$

or a power sum of the remaining carriers.

As an example of the subembodiment, the third power is equal to a difference between $P_{TMAX}$ and a fourth power.

As an example of the subembodiment, define a remaining power $P_{RE}$, and the $P_{RE}$ meets:

$$P_{RE} = P_{TMAX} - P_2(j) - \sum_{y \in Y} P_y(j)$$

As an example of the subembodiment, the $P_1^{Ideal}(j)$ is less than or equal to $P_{RE}$, the first power is equal to the $P_1^{Ideal}(j)$.

As an example of the subembodiment, the $P_1^{Ideal}(j)$ is greater than $P_{RE}$, the first power is equal to a product of the $P_1^{Ideal}(j)$ and the scaling factor w, and meets $w \cdot P_1^{Ideal}(j) \leq P_{RE}$.

As an example of the subembodiment, the Y is equal to 0, and the $$\sum_{y \in Y} P_y(j)$$

is equal to 0.

In one subembodiment, the first radio signal carries the first bit block and the first bit block of the first UCI, the first low latency radio signal carries the low latency UCI, and the low latency UCI is transmitted by a physical layer data channel; in the remaining carriers, there are PUCCH or sPUCCH transmitted by Y1 carriers, and a physical layer signal transmitted by a Y2 carriers is a UCI-included PUSCH or a UCI-included sPUSCH; the Y1 and the Y2 are integers not less than 0, and a sum of the Y1 and the Y2 is less than and equal to (M−2);

A sum of transmission powers of the Y1 carriers is $$\sum_{y1 \in Y1} P_{y1}(j),$$

a sum of transmission powers of the Y2 is $$\sum_{y2 \in Y2} P_{y2}(j);$$

the second power $P_2(j)$ meets the following formula:

$$P_2(j) = \min\begin{cases} P_{TMAX} - \sum_{y1 \in Y1} P_{y1}(j), \\ 10\log_{10}(\hat{P}_{CMAX,C_2}(j)), \\ 10\log_{10}(M_{PUSCH,C_2}(j)) + P_{O\_PUSCH,C_2}(j) + \alpha_{C_2}(j) \cdot PL_{C_2} + \\ \Delta_{TF,C_2}(j) + f_{C_2}(j) \end{cases}$$

wherein the second carrier is indexed by a subscript $C_2$, $M_{PUSCH,C_1}(j)$ is related to the number of PRB pairs occupied by the first radio signal in the frequency domain, $P_{O\_PUSCH,C_1}(j)$ and $\alpha_{C_1}(j)$ are related to a high level signaling configuration, $f_{C_1}(j)$ is related to TPC. The specific meaning can be found in 3GPP Technical Specification (TS) 36.213, chapter 5.1.

In one subembodiment, the fourth power is equal to $$\sum_{y \in Y1} P_{y1}(j) + \sum_{y \in Y2} P_{y2}(j)$$

or a sum of power value(s) of the remaining carriers.

In one subembodiment, the third power is equal to a difference between $P_{TMAX}$ and a fourth power.

In one subembodiment, define a remaining power $P_{RE1}$, and the $P_{RE1}$ meets:

$$P_{RE} = P_{TMAX} - P_2(j) - \sum_{y \in Y1} P_{y1}(j) - \sum_{y \in Y2} P_{y2}(j)$$

In one subembodiment, the $P_1^{Ideal}(j)$ is:

$$P_1^{Ideal}(j) = \min\begin{cases} 10\log_{10}(\hat{P}_{CMAX,C_1}(j)), \\ 10\log_{10}(M_{PUSCH,C_1}(j)) + P_{O\_PUSCH,C_1}(j) + \alpha_{C_1}(j) \cdot \\ PL_{C_1} + \Delta_{TF,C_1}(j) + f_{C_1}(j) \end{cases}$$

In one subembodiment, the $P_1^{Ideal}(j)$ is less than or equal to $P_{RE1}$, the first power is equal to the $P_1^{Ideal}(j)$.

In one subembodiment, the $P_1^{Ideal}(j)$ is greater than $P_{RE1}$, the first power is equal to a product of the $P_1^{Ideal}(j)$ and the scaling factor w, and meets $w \cdot P_1^{Ideal}(j) \leq P_{RE1}$.

In one subembodiment, the Y1 is equal to 0, and the $$\sum_{y \in Y1} P_{y1}(j)$$

is equal to 0.

In one subembodiment, the Y2 is equal to 0, and the $$\sum_{y \in Y2} P_{y2}(j)$$

is equal to 0.

In one embodiment, the first ideal power is greater than a difference between the third power and the second power, the R power value(s) is(are) respectively a transmission power of corresponding low latency radio signals without power scaling.

In one subembodiment, the R low latency radio signal(s) at least comprises(comprise) a given low latency radio signal, the given low latency signal carries the low latency bit block and the low latency bit block of the low latency UCI.

In one subembodiment, in the above subembodiment, a priority of the information type carried by the given low latency radio signal is equal to or lower than a priority corresponding to the information type carried by the first radio signal. However, for power scaling, a priority of the given low latency radio signal is higher than a priority of the first radio signal.

As an embodiment, the characteristics of the above subembodiment are, in the R low latency radio signal(s) although there is the given low latency radio signal which has a lower priority compare with the first radio signal, the first low latency signal in the first time interval has a higher priority than the first radio signal, the power scaling will be based on the judgement in the first time interval.

According to one aspect of the present, wherein at least a first time interval in the R time interval(s) belongs to the target time interval set; the first radio signal carries the first UCI, the first low latency radio signal carries the low latency bit block between the low latency bit block and the low latency UCI; or the first low radio signal carries the first UCI, the first low latency radio signal carries the low latency UCI, the first UCI is transmitted by a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the UE on the first time interval on carrier(s) other than the first carrier and the second carrier;

In one embodiment, the characteristics of the above subembodiment are, a priority of the first radio signal is higher than a priority of the low latency radio signal, the first radio signal preferentially allocates a transmission power to ensure receiving performance of the first radio signal.

In one embodiment, a physical layer channel corresponding to the first radio signal is a UCI-included PUSCH or a UCI-included sPUSCH, and a physical layer channel corresponding to the first radio signal is a UCI-excluded PUSCH or a UCI-excluded sPUSCH.

In one embodiment, a physical layer channel corresponding to the first radio signal is PUCCH or sPUCCH, and a physical layer channel corresponding to the low latency radio signal is a UCI-included PUSCH or a UCI-included sPUSCH.

In one embodiment, a physical layer channel corresponding to the first radio signal is PUCCH or sPUCCH, and a physical layer channel corresponding to the low latency radio signal is a UCI-excluded PUSCH or a UCI-excluded sPUSCH.

In one embodiment, the second ideal power is invariant.

In one embodiment, the second ideal is generated in a predefined method.

In one embodiment, the second ideal power is configurable.

In one embodiment, the second ideal power and the given time interval are related to at least one of a given subframe position and a given subframe position. Wherein the given subframe is a subframe of the given time interval, a given radio frame is a radio frame occupied by the given subframe.

In one embodiment, the second ideal power is related to the kind of physical layer channel corresponding to the first radio signal.

In one embodiment, the UE transmits uplink physical signaling on M carriers in the first time interval; the M carriers comprise the first carrier and the second carrier, subscripts 3 to M for the remaining carriers other than the first carrier and the second carrier among the M carriers; the j indicates a position number of the first time interval in a given subframe. The given subframe is a subframe occupied by the first time interval; the M is a positive integer not less than 2.

In one subembodiment, a physical layer channel corresponding to the first low latency radio signal is PUCCH or sPUCCH, the PUCCH uses one of PUCCH Format 1, PUCCH Format 1a, PUCCH Format 1b, PUCCH Format 2, PUCCH Format 2a, PUCCH Format 2b and PUCCH Format 3; or the sPUCCH uses one of PUCCH Format 1, PUCCH Format 1a, PUCCH Format 1b, PUCCH Format 2, PUCCH Format 2a, PUCCH Format 2b and PUCCH Format 3; the first power $P_1(j)$ meets the following formula:

$$P_1(j) = \min \begin{Bmatrix} P_{CMAX,C_1}(j), \\ P_{0\_PUCCH} + PL_{C_1} + h(n_{CQI}, n_{HARQ}, n_{SR}) + \Delta_{F\_PUCCH}(F) + \\ \Delta_{TxD}(F') + g(j) \end{Bmatrix}$$

wherein the second carrier is indexed by a subscript $C_1$, $P_{CMAX,C_1}(j)$ is a configuration power of the UE on a second carrier, and linearly related to the maximum transmission power supported by the UE, the $\Delta_{F\_PUCCH}(F)$ and $\Delta_{TxD}(F')$ is configured by high level signaling $h(n_{CQI}, n_{HARQ}, n_{SR})$ is related to the PUCCH Format used by the first low latency radio signal, $P_{0\_PUCCH}$ related to high level signaling configuration, $PL_{C_2}$ corresponding to the path loss of the UE on the second carrier, $g(j)$ related to Transmission Power Control (TPC); the specific meaning can be found in 3GPP Technical Specification (TS) 36.213, chapter 5.1.

In one subembodiment, a physical layer channel corresponding to the first low latency radio signal is PUCCH or sPUCCH, the PUCCH uses one of PUCCH Format 4 and PUCCH Format 5; or the sPUCCH uses one of PUCCH Format 4 and PUCCH Format 5; the first power $P_2(j)$ meets the following formula:

$$P_1(j) = \min \begin{Bmatrix} P_{CMAX,C_1}(j), \\ P_{0\_PUCCH} + PL_{C_1} + 10\log_{10}(M_{PUCCH,C_1}(j)) + \Delta_{TF,C_1}(j) + \\ \Delta_{F\_PUCCH}(F) + g(j) \end{Bmatrix}$$

wherein the second carrier is indexed by a subscript $C_1$, $M_{PUCCH,C_1}(j)$ indicates the number of Physical Resource Block (PRB) pairs occupied by the low latency radio signal, $\Delta_{TF,C_1}(j)$ is related to the number of bits occupied by the first low latency radio signal, the specific meaning can be found in 3GPP Technical Specification (TS) 36.213, chapter 5.1.

In one subembodiment of the above two embodiments, among the remaining carriers, there is an uplink signal carrying UCI transmitted by Y carriers, and the first radio signal does not carry UCI; or there are Y carriers transmitting PUCCH or sPUCCH, and the first low latency radio signal corresponds to a PUSCH and a sPUSCH. A sum of a corresponding transmission power on the Y carriers is equal to $$\sum_{y \in Y} P_y(j).$$

The Y is less than or equal to (M−2). The first ideal power $P_2^{Ideal}(j)$ meets the following formula:

$$P_2^{Ideal}(j) = \min \begin{Bmatrix} 10\log_{10}(\hat{P}_{CMAX,C_2}(j)), \\ 10\log_{10}(M_{PUSCH,C_2}(j)) + P_{O\_PUSCH,C_2}(j) + \alpha_{C_2}(j) \cdot \\ PL_{C_2} + \Delta_{TF,C_2}(j) + f_{C_2}(j) \end{Bmatrix}$$

wherein the second carrier is indexed by a subscript $C_2$, $M_{PUSCH,C_2}(j)$ is related to the number of PRB pairs occupied by the first radio signal in the frequency domain, $P_{O\_PUSCH,C_2}(j)$, $\Delta_{TF,C_2}(j)$ and $\alpha_{C_2}(j)$ are related to a high level signaling configuration, $f_{C_2}(j)$ is related to TPC. The specific meaning can be found in 3GPP Technical Specification (TS) 36.213, chapter 5.1.

As an example of the subembodiment, define a remaining power $P_{RE}$, and the $P_{RE}$ meets:

$$P_{RE} = P_{TMAX} - P_1(j) - \sum_{y \in Y} P_y(j)$$

As an example of the subembodiment, the fourth power is equal to $$\sum_{y \in Y} P_y(j)$$

or a power sum of the remaining carriers.

As an example of the subembodiment, the third power is equal to a difference between $P_{TMAX}$ and a fourth power.

As an example of the subembodiment, the $P_2^{Ideal}(j)$ is less than or equal to $P_{RE}$, the second power is equal to the $P_2^{Ideal}(j)$.

As an example of the subembodiment, the $P_2^{Ideal}(j)$ is greater than $P_{RE}$, the second power is equal to a product of the $P_2^{Ideal}(j)$ and the scaling factor w, and meets $w \cdot P_2^{Ideal}(j) \leq P_{RE}$.

As an example of the subembodiment, the Y is equal to 0, and the $$\sum_{y \in Y} P_y(j)$$

is equal to 0.

In one subembodiment, the first low latency radio signal carries the low latency bit block and the low latency bit block of the low latency UCI, the first radio signal carries the first UCI, and the first UCI is transmitted by a physical layer data channel; in the remaining carriers, there are PUCCH or sPUCCH transmitted by Y1 carriers, and a physical layer signal transmitted by a Y2 carriers is a UCI-included PUSCH or a UCI-included sPUSCH; the Y1 and the Y2 are integers not less than 0, and a sum of the Y1 and the Y2 is less than and equal to (M−2);

A sum of transmission powers of the Y1 carriers is $$\sum_{y1 \in Y1} P_{y1}(j),$$

a sum of transmission powers of the Y2 is $$\sum_{y2 \in Y2} P_{y2}(j);$$

the first power $P_1(j)$ meets the following formula:

$$P_1(j) = \min \begin{cases} P_{TMAX} - \sum_{y1 \in Y1} P_{y1}(j), \\ 10 \log_{10}(\hat{P}_{CMAX,C_1}(j)), \\ 10 \log_{10}(M_{PUSCH,C_1}(j)) + P_{O\_PUSCH,C_1}(j) + \\ \alpha_{C_1}(j) \cdot PL_{C_1} + \Delta_{TF,C_1}(j) + f_{C_1}(j) \end{cases}$$

wherein the second carrier is indexed by a subscript $C_1$, $M_{PUSCH,C_1}(j)$ is related to the number of PRB pairs occupied by the first radio signal in the frequency domain, $P_{O\_PUSCH,C_1}(j)$ and $\alpha_{C_1}(j)$ are related to a high level signaling configuration, $f_{C_1}(j)$ is related to TPC. The specific meaning can be found in 3GPP Technical Specification (TS) 36.213, chapter 5.1.

In one subembodiment, define a remaining power $P_{RE1}$, and the $P_{RE1}$ meets:

$$P_{RE} = P_{TMAX} - P_2(j) - \sum_{y \in Y1} P_{y1}(j) - \sum_{y \in Y2} P_{y2}(j)$$

In one subembodiment, the fourth power is equal to $$\sum_{y \in Y1} P_{y1}(j) + \sum_{y \in Y2} P_{y2}(j)$$

or a sum of power values of the remaining carriers.

In one subembodiment, the third power is equal to a difference between $P_{TMAX}$ and a fourth power.

In one subembodiment, the $P_2^{Ideal}(j)$ is:

$$P_2^{ideal}(j) = \min \begin{cases} 10 \log_{10}(\hat{P}_{CMAX,C_2}(j)), \\ 10 \log_{10}(M_{PUSCH,C_2}(j)) + P_{O\_PUSCH,C_2}(j) + \\ \alpha_{C_2}(j) \cdot PL_{C_2} + \Delta_{TF,C_2}(j) + f_{C_2}(j) \end{cases}$$

In one subembodiment, the $P_2^{Ideal}(j)$ is less than or equal to $P_{RE1}$, the second power is equal to the $P_2^{Ideal}(j)$.

In one subembodiment, the $P_2^{Ideal}(j)$ is greater than $P_{RE1}$, the second power is equal to a product of the $P_2^{Ideal}(j)$ and the scaling factor w, and meets $w \cdot P_2^{Ideal}(j) \leq P_{RE1}$.

In one subembodiment, the Y1 is equal to 0, and the $$\sum_{y \in Y1} P_{y1}(j)$$

is equal to 0.

In one subembodiment, the Y2 is equal to 0, and the $$\sum_{y \in Y2} P_{y2}(j)$$

is equal to 0.

In one embodiment, the R low latency radio signals comprise at least a given low latency radio signal, the given low latency radio signal carries the low latency bit block between the low latency UCI and the low latency UCI, time-domain resource occupied by the given low latency radio signal is out of the target time interval set, a power allocated to the given low latency radio signal is a given power of the R power value(s), the given power is less than a given ideal power, the given ideal power is a transmission power of the given low latency radio signal without power scaling.

In one subembodiment, the given power is equal to a difference between a third power and a first power.

As one sub-subembodiment of the subembodiment, in the above subembodiment, a priority of the information type carried by the given low latency radio signal is equal to or higher than a priority corresponding to the information type carried by the first radio signal. However, for power scaling, a priority of the given low latency radio signal is lower than a priority of the first radio signal.

As an embodiment, the characteristics of the above subembodiment are: in the R low latency radio signals, there is a given low latency radio signal out of the target time interval set (i.e, outside the observation window), and a priority of the given low latency radio signal is higher than a priority of the first radio signal. However, the power allocation and power scaling are still performed according to a relationship between a first low latency radio signal observed in the first time interval and a priority of the first radio signal. When a priority of the first low latency radio signal is lower than a priority of the first radio signal, power allocation is still dominant in the first radio signal. Wherein the first low latency radio signal is a low latency radio signal in the first time interval.

According to an aspect of the present, wherein at least a first time interval of the R time interval(s) belongs to the target time interval set; the first radio signal carries the first bit block between the first bit block and the first UCI; the first low latency radio signal carries the low latency bit block between the low latency bit block and the low latency UCI, the first low latency radio signal carries the low latency UCI, the first UCI is transmitted by a physical layer control channel, the low latency UCI is transmitted by a physical layer control channel; or the first radio signal carries a first UCI, the first low latency radio signal carries the low latency UCI, the first UCI is transmitted by a physical layer data channel, the low latency uplink control channel is transmitted by a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than 1;

In one embodiment, wherein a priority of the first radio signal is equal to a priority of the low latency radio signal, the first radio signal and the low latency radio signal together allocate a transmission power to ensure reception performance of both.

In one embodiment, a physical layer channel corresponding to the first radio signal is a UCI-excluded PUSCH or a UCI-excluded sPUSCH, and a physical layer channel corresponding to the first radio signal is a UCI-excluded PUSCH or a UCI-excluded sPUSCH.

In one embodiment, a physical layer channel corresponding to the first radio signal is a UCI-included PUSCH or a UCI-included sPUSCH, and a physical layer channel corresponding to the first radio signal is a UCI-included PUSCH or a UCI-included sPUSCH.

In one embodiment, a physical layer channel corresponding to the first radio signal is PUCCH or sPUCCH, and a physical layer channel corresponding to the low latency radio signal is PUCCH or sPUCCH.

In one embodiment, the first radio signal carries the first UCI, and a scaling factor corresponding to the first ideal power is equal to 1.

In one embodiment, the low latency radio signal carries the low latency UCI, and a scaling factor corresponding to the second ideal power is equal to 1.

In one embodiment, the first radio signal carries the first bit block and the first bit block in the first UCI, and a scaling factor corresponding to the first ideal power is less than 1.

In one embodiment, the first radio signal carries the first bit block and the first bit block in the first UCI, and a scaling factor corresponding to the second ideal power is less than 1.

In one embodiment, the first power is $P_1(j)$, the first ideal power is $P_1^{Ideal}$, the second power is $P_2(j)$, the second ideal power is $P_2^{Ideal}$, the third power is $P_{Remain}(j)$, a sum of $P_1^{Ideal}$ and $P_2^{Ideal}$ is less than or equal to $P_{Remain}(j)$, $P_1(j)$ and $P_2(j)$ satisfy the following formula:

$P_1(j)=P_1^{Ideal}$ $P_2(j)=P_2^{Ideal}$

In one subembodiment, the j indicates position number of the given time interval in a given subframe. The given subframe is a subframe occupied by the given time interval.

In one subembodiment, the $P_{Remain}(j)$ meets the following formula:

$$P_{Remain}(j) = P_{TMAX} - \sum_{C_n \neq C_1, C_n \neq C_2}^{C_M} P_{C_n}(j)$$

wherein the $P_{TMAX}$ is a maximum power transmitted by UE uplink, the $P_{C_n}(j)$ is a transmission power of the carrier $C_n$ on a given time interval. The $$\sum_{C_n \neq C_1, C_n \neq C_2}^{C_M} P_{C_n}(j)$$

corresponds to the fourth power, the carrier $C_1$ corresponds to the first carrier, the carrier $C_2$ corresponds to the second carrier, the carrier set $C_M$ corresponds to all carriers that the UE performs uplink transmission simultaneously on the time intervals. The carrier $C_n$ is a carrier other than the first carrier and the second carrier.

As an example of one subembodiment, the carrier $C_n$ transmits PUCCH or sPUCCH on the given time interval.

As an example of one subembodiment, the carrier $C_n$ transmits a UCI-included PUSCH or a UCI-included sPUSCH on the given time interval, and a physical layer channel corresponding to the first radio signal and the low latency radio signal respectively is a UCI-excluded PUSCH or a UCI-excluded sPUSCH.

As an example of one subembodiment, the carrier $C_n$ transmits a UCI-excluded PUSCH or a UCI-excluded sPUSCH on the given time interval, and a physical layer channel corresponding to the first radio signal and the low latency radio signal respectively is a UCI-excluded PUSCH or a UCI-excluded sPUSCH.

In one embodiment, the first power is $P_1(j)$, the first ideal power is $P_1^{Ideal}$, the second power is $P_2(j)$, the second ideal power is $P_2^{Ideal}$, the third power is $P_{Remain}(j)$, a sum of $P_1^{Ideal}$ and $P_2^{Ideal}$ is less than or equal to $P_{Remain}(j)$, $P_1(j)$ and $P_2(j)$ satisfy the following formula:

$P_1(j)=w \cdot P_1^{Ideal}$ $P_2(j)=w \cdot P_2^{Ideal}$ and $w \cdot P_1^{Ideal} + w \cdot P_2^{Ideal} \leq P_{Remain}(j)$ wherein w is the scaling factor, and w is a integer greater or equal to 0, and less than or equal to 1.

As an example of one subembodiment, the j indicates position number of the given time interval in a given subframe. The given subframe is a subframe occupied by the given time interval.

As an example of one subembodiment, the $P_{Remain}(j)$ meets the following formula:

$$P_{Remain}(j) = P_{TMAX} - \sum_{C_n \neq C_1, C_n \neq C_2}^{C_M} P_{C_n}(j)$$

wherein the $P_{TMAX}$ is a maximum power transmitted by UE uplink, the $P_{C_n}(j)$ is a transmission power of the carrier $C_n$ on a given time interval. The $$\sum_{C_n \neq C_1, C_n \neq C_2}^{C_M} P_{C_n}(j)$$

corresponds to the fourth power, the carrier $C_1$ corresponds to the first carrier, the carrier $C_2$ corresponds to the second carrier, the carrier set $C_M$ corresponds to all carriers that the UE performs uplink transmission simultaneously on the time intervals. The carrier $C_n$ is a carrier other than the first carrier and the second carrier.

As an example of one subembodiment, the carrier $C_n$ transmits PUCCH or sPUCCH on the given time interval.

As an example of one subembodiment, the carrier $C_n$ transmits a UCI-included PUSCH or a UCI-included sPUSCH on the given time interval, and a physical layer channel corresponding to the first radio signal and the low latency radio signal respectively is a UCI-excluded PUSCH or a UCI-excluded sPUSCH.

As an example of one subembodiment, the carrier $C_n$ transmits a UCI-excluded PUSCH or a UCI-excluded sPUSCH on the given time interval, and a physical layer channel corresponding to the first radio signal and the low latency radio signal respectively is a UCI-excluded PUSCH or a UCI-excluded sPUSCH.

In one embodiment, the R low latency radio signal(s) comprises(comprise) at least a given low latency radio signal; time-domain resource occupied by the given low latency radio signal is out of the target time interval set, the power allocated to the given low latency radio signal is a given power of the R power value(s); the first radio signal carries the first bit block and the first bit block in the first UCI, the given low latency radio signal carries the low latency bit block and the low latency UCI in the low latency UCI; or the first radio signal carries a first UCI, the first low latency radio signal carries the low latency UCI, the first UCI is transmitted by a physical layer data channel, the low latency uplink control channel is transmitted by a physical layer data channel; the given power is equal to a product of a given scaling and a given ideal power, the given ideal power is a transmission power of the given low latency radio signal without power scaling.

As a subembodiment, in the above subembodiment, a priority of the information type carried by the given low latency radio signal is equal to or higher than a priority corresponding to the information type carried by the first radio signal; however, for power scaling, a priority of the given low latency radio signal is lower than a priority of the first radio signal.

As an embodiment, the characteristics of the above subembodiment are: in the R low latency radio signals, there is a given low latency radio signal out of the target time interval set (ie, outside the observation window), and a priority of the given low latency radio signal is higher than a priority of the first radio signal; however, the power allocation and power scaling are still performed according to a relationship between a first low latency radio signal observed in the first time interval and a priority of the first radio signal. When a priority of the first low latency radio signal is lower than a priority of the first radio signal, power allocation is still dominant in the first radio signal, wherein the transmission function of the given low latency radio signal still needs to be multiplied by the scaling factor; the first low latency radio signal is a low latency radio signal in the first time interval.

In one embodiment, the R low latency radio signal(s) comprises(comprise) at least a given low latency radio signal; time-domain resource occupied by the given low latency radio signal is out of the target time interval set, the power allocated to the given low latency radio signal is a given power of the R power value(s); the first radio signal carries the first bit block and the first bit block in the first UCI, the given low latency radio signal carries the low latency bit block and the low latency UCI in the low latency UCI; or the first radio signal carries a first UCI, the first low latency radio signal carries the low latency UCI, the first UCI is transmitted by a physical layer data channel, the low latency uplink control channel is transmitted by a physical layer data channel; the given power is equal to a product of a given scaling and a given ideal power, the given ideal power is a transmission power of the given low latency radio signal without power scaling, the given scaling factor is greater than the scaling factor.

As a subembodiment, in the above subembodiment, a priority of the information type carried by the given low latency radio signal is equal to or lower than a priority corresponding to the information type carried by the first radio signal; however, for power scaling, a priority of the given low latency radio signal is higher than a priority of the first radio signal.

As an embodiment, the characteristics of the above subembodiment are: in the R low latency radio signals, there is a given low latency radio signal out of the target time interval set (ie, outside the observation window), and a priority of the given low latency radio signal is lower than a priority of the first radio signal. However, the power allocation and power scaling are still performed according to a relationship between a first low latency radio signal observed in the first time interval and a priority of the first radio signal. When a priority of the first low latency radio signal is higher than a priority of the first radio signal, power allocation is still dominant in the first radio signal, wherein the transmission function of the given low latency radio signal still needs to be multiplied by the scaling factor; the first low latency radio signal is a low latency radio signal in the first time interval.

According to an aspect of the present, wherein the R time interval(s) are out of the target time interval set, the first power is equal to a first ideal power, the first ideal power is a transmission power of the first radio signal without power scaling; the R power value(s) are less or equal to a difference between a third power and a first power; the third power is a maximum total transmission power minus a fourth power, the fourth power is a total transmission power of the UE on the first time interval on carrier(s) other than the first carrier and the second carrier.

As an embodiment, the characteristics of the above subembodiment are in the target time interval set (in the observation window), the transmission of the low latency radio signal is not detected, therefore the first radio signal is transmitted with the first ideal power rather than power scaling; the R power value(s) can only be allocated based on a maximum transmitting total power minus the fourth power minus the first power.

According to an aspect of the present, wherein R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted by the physical layer data and not comprises (comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

As an embodiment, the characteristics of the above sub-embodiment are, when time-domain resources occupied by a plurality of low latency radio signals of the R low latency radio signals belong to the target time interval set, the first low latency radio signal for reference power scaling and power allocation, is the low latency radio signal with the highest power among the plurality of low latency radio signals; the method facilitates the UE to perform function scaling more accurately, to prevent the total transmission power from exceeding the maximum transmit total power of the UE.

According to an aspect of the present, comprising:

receiving a first signaling, the first signaling is used to determine a first power control parameter;

wherein the first power control parameter comprises a configuration parameter of the first ideal power.

According to one aspect of the present disclosure, the above method is characterized in that, the first ideal power is configurable, this makes a system more flexible for power distribution and power scaling.

In one embodiment, a physical layer channel corresponding to the first radio signal is PUCCH or sPUCCH, the configuration parameter of the first ideal power comprises at least one of $P_{CMAX,C_1}(j)$, $g(j)$, $P_{0\_PUCCH}$, $\Delta_{F\_PUCCH,C_1}(F)$, $\Delta_{TxD,C_1}(F')$ and $h(n_{CQI}, n_{HARQ}, n_{SR})$; $n_{CQI}, n_{HARQ}, n_{SR}$ indicates Channel Quality Indicator (CQI) information bit number respectively, Hybrid Automatic Repeat Request Acknowledge (HARQ) bit number, Scheduling Request (SR) transmitting symbol; the specific meaning can be found in 3GPP Technical Specification (TS) 36.213, chapter 5.1.

According to an aspect of the present, comprising:

receiving a second signaling, the second signaling is used to determine a second power control parameter;

wherein the second power control parameter comprises a configuration parameter of the second ideal power.

According to one aspect of the present disclosure, the above method is characterized in that, the second ideal power is configurable, this makes the system more flexible for power distribution and power scaling.

In one embodiment, a physical layer channel corresponding to the first radio signal is PUCCH or sPUCCH, the configuration parameter of the second ideal power comprises at least one of $P_{CMAX,C_2}(j)$, $g(j)$, $P_{0\_PUCCH}$, $\Delta_{F\_PUCCH,C_2}(F)$, $\Delta_{TxD,C_2}(F')$ and $h(n_{CQI}, n_{HARQ}, n_{SR})$; the specific meaning can be found in 3GPP Technical Specification (TS) 36.213, chapter 5.1.

In one embodiment, a physical layer channel corresponding to the first radio signal is PUCCH or sPUCCH, the configuration parameter of the second ideal power comprises at least one of $P_{CMAX,C_2}(j)$, $f_{C_2}(j)$, $P_{0\_PUSCH,C_2}$, $\Delta_{TxD,C_2}(F')$, $\Delta_{TxD,C_2}(j)$ and $\alpha_{C_2}(j)$; the specific meaning can be found in 3GPP Technical Specification (TS) 36.213, chapter 5.1.

A method in a base station for low latency communication, comprising:

detecting a first radio signal on a first carrier;

detecting R low latency radio signal(s) on a second carrier;

wherein the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one embodiment, detecting a first radio signal on the first carrier is: determining a value of the first power and comparing; if the first power is greater than a given threshold value, receiving a first radio signal on a first carrier; if a first power is not less than a given threshold value, dropping a first radio signal reception on a first carrier.

In one subembodiment, the receiving is demodulating and decoding.

In one subembodiment, the dropping means not performing demodulating or decoding.

In one subembodiment, the phrase determining a value of the first power is: determining a value of the first power by determining a power of an uplink demodulation reference signal corresponding to the first radio signal.

In one embodiment, detecting the R low latency radio signal(s) on the second carrier is: determining the R power value(s) corresponding to R low latency radio signal(s); if a given power is greater than a given threshold value, receiving a low latency radio signal on a second carrier with a given power; if a given power is not less than a given threshold value, dropping a low latency radio signal reception on a second carrier.

In one subembodiment, the given power is one of the R power value(s), the given low latency radio signal is a low latency radio signal corresponding to the given power in the R low latency radio signals In one subembodiment, the receiving is demodulating and decoding.

In one subembodiment, the dropping means performing demodulating or decoding.

In one subembodiment, determining the R power value(s) corresponding to the R low latency radio signal(s): determining a value of a given power by determining a power of an uplink demodulation reference signal corresponding to the first radio signal. A transmission power of the given low latency radio signal is the given power.

In one subembodiment, the given threshold value is invariant or configurable.

According to one aspect of the present disclosure, wherein at least the first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted by a physical layer data channel, the low latency UCI is transmitted by a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the UE on the first time interval on carrier(s) other than the first carrier and the second carrier.

According to one aspect of the present disclosure, wherein at least the first time interval of the R time interval(s) belongs to the target time interval set; the first radio signal carries the first UCI, the first low latency radio signal carries the low latency bit block between the low latency bit block and the low latency UCI; or the first radio carries the first UCI, the first low latency radio signal carries the low latency UCI, the first UCI is transmitted by a physical layer data channel, the low latency UCI is transmitted by a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the UE on the first time interval on carrier(s) other than the first carrier and the second carrier.

According to an aspect of the present disclosure, wherein at least a first time interval of the R time interval(s) belongs to the target time interval set; the first radio signal carries the first bit block between the first bit block and the first UCI; the first low latency radio signal carries the low latency bit block between the low latency bit block and the low latency UCI; or the first radio signal carries the first UCI, the first low latency radio signal carries the low latency UCI, the first UCI is transmitted by a physical layer control channel, the low latency UCI is transmitted by a physical layer control channel; or the first radio signal carries a first UCI, the first low latency radio signal carries the low latency UCI, the first UCI is transmitted by a physical layer data channel, the low latency uplink control channel is transmitted by a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than 1.

According to one aspect of the present disclosure, wherein the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the UE on the first time interval on carrier(s) other than the first carrier and the second carrier.

According to one aspect of the present disclosure, wherein R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted by the physical layer data and not comprises(comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

According to one aspect of the present disclosure, comprising:

transmitting a first signaling, the first signaling is used to determine a first power control parameter;

wherein the first power control parameter comprises a configuration parameter of the first ideal power.

According to one aspect of the present disclosure, comprising:

transmitting a second signaling, the second signaling is used to determine a second power control parameter;

wherein the second power control parameter comprises a configuration parameter the second ideal power.

A user equipment for low latency communication, comprising:

a first transceiver, determining a first power, and transmitting a first radio signal on a first carrier;

a second transceiver, determining R power value(s), and transmitting R low latency radio signal(s) on a second carrier respectively;

wherein the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

According to one aspect of the present disclosure, the user equipment is characterized in that, the first transceiver also receives a first signaling, the first signaling is used to determine a first power control parameter, the first power control parameter comprises a configuration parameter of the first ideal power.

According to one aspect of the present disclosure, the user equipment is characterized in that, at least the first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted by a physical layer data channel, the low latency UCI is transmitted by a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the UE on the first time interval on carrier(s) other than the first carrier and the second carrier.

According to one aspect of the present disclosure, the user equipment is characterized in that, at least the first time interval of the R time interval(s) belongs to the target time interval set; the first radio signal carries the first UCI, the first low latency radio signal carries the low latency bit block between the low latency bit block and the low latency UCI; or the first radio carries the first UCI, the first low latency radio signal carries the low latency UCI, the first UCI is transmitted by a physical layer data channel, the low latency UCI is transmitted by a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the UE on the first time interval on carrier(s) other than the first carrier and the second carrier.

According to one aspect of the present disclosure, the user equipment is characterized in that, at least a first time interval of the R time interval(s) belongs to the target time interval set; the first radio signal carries the first bit block between the first bit block and the first UCI; the first low latency radio signal carries the low latency bit block between the low latency bit block and the low latency UCI; or the first radio signal carries the first UCI, the first low latency radio signal carries the low latency UCI, the first UCI is transmitted by a physical layer control channel, the low latency UCI is transmitted by a physical layer control channel; or the first radio signal carries a first UCI, the first low latency radio signal carries the low latency UCI, the first UCI is transmitted by a physical layer data channel, the low latency uplink control channel is transmitted by a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than 1.

According to one aspect of the present disclosure, the user equipment is characterized in that, the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the UE on the first time interval on carrier(s) other than the first carrier and the second carrier.

According to one aspect of the present disclosure, R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted by the physical layer data and not comprises (comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

A base station for low latency communication, comprising:
a third transceiver, detecting a first radio signal on a first carrier;
a fourth transceiver, detecting R low latency radio signal(s) on a second carrier;
wherein, the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

According to one aspect of the present disclosure, the base station is characterized in that, the third transceiver also transmits a first signaling, the first signaling is used to determine a first power control parameter, the first power control parameter comprises a configuration parameter of the second ideal power.

According to one aspect of the present disclosure, the base station is characterized in that, the fourth transceiver also transmits a second signaling, the second signaling is used to determine a second power control parameter, the second power control parameter comprises a configuration parameter of the second ideal power.

According to one aspect of the present disclosure, the base station is characterized in that, at least the first time interval of the R time interval(s) belongs to the target time interval set; the first radio signal carries the first bit block between the first bit block and the first UCI, the first low latency radio signal carries the low latency UCI; or the first radio signal carries the first UCI, the first low latency radio signal carries the low latency UCI, the first UCI is transmitted by a physical layer data channel, the low latency UCI is transmitted by a physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the UE on the first time interval on carrier(s) other than the first carrier and the second carrier.

According to one aspect of the present disclosure, the base station is characterized in that, at least the first time interval of the R time interval(s) belongs to the target time interval set; the first radio signal carries the first UCI, the first low latency radio signal carries the low latency bit block between the low latency bit block and the low latency UCI; or the first radio carries the first UCI, the first low latency radio signal carries the low latency UCI, the first UCI is transmitted by a physical layer data channel, the low latency UCI is transmitted by a physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the UE on the first time interval on carrier(s) other than the first carrier and the second carrier.

According to one aspect of the present disclosure, the base station is characterized in that, at least a first time interval of the R time interval(s) belongs to the target time interval set; the first radio signal carries the first bit block between the first bit block and the first UCI; the first low latency radio signal carries the low latency bit block between the low latency bit block and the low latency UCI; or the first radio signal carries the first UCI, the first low latency radio signal carries the low latency UCI, the first UCI is transmitted by a physical layer control channel, the low latency UCI is transmitted by a physical layer control channel; or the first radio signal carries a first UCI, the first low latency radio signal carries the low latency UCI, the first UCI is transmitted by a physical layer data channel, the low latency uplink control channel is transmitted by a physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than 1.

According to one aspect of the present disclosure, the base station is characterized in that, the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the UE on the first time interval on carrier(s) other than the first carrier and the second carrier.

According to one aspect of the present disclosure, the base station is characterized in that, R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted by the physical layer data and not comprises (comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

In one embodiment, compared with the prior art, the present disclosure has the following technical advantages:

By designing the target time interval set, performing power scaling on the first carrier in the target time interval set and a channel type of a transmitting signal on the second carrier, facilitate power scaling between carriers of different sTTIs.

By comparing information carried by the first radio signal and the given low latency radio signal and types of corresponding physical layer channel, determine the first power and the R power value(s), prioritize power to control information that requires more guaranteed transmission performance, to improve uplink transmission performance.

By designing a first signaling and the second signaling, flexibly configuring the first ideal power and the second ideal power, to further optimize an allocation of power.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if no conflict is caused.

Embodiment 1

Figure 1:
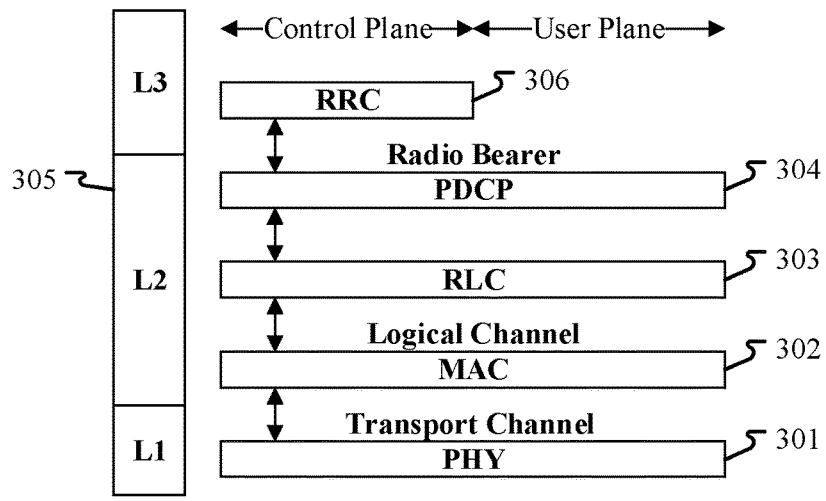
FIG. 1 is a diagram illustrating a radio protocol architecture of a user plane and a control plane according to one embodiment of the present disclosure.

Embodiment 1 illustrates a schematic diagram of a radio protocol architecture of a user plane and a control plane according to the present disclosure, as shown in FIG. 1. FIG. 1 illustrates a schematic diagram of a radio protocol architecture of a user plane and a control plane. In FIG. 1, the radio protocol architecture of user equipment (UE) and Base Station Equipment (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 comprises a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may comprise several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for a UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also comprises a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, a radio protocol architecture in FIG. 1 is applicable to a base station device in the present.

In one subembodiment, the first signaling is generated by the RRC sublayer 306.

In one subembodiment, the first signaling is generated by the MAC sublayer 302.

In one subembodiment, the second signaling is generated by the RRC sublayer 306.

In one subembodiment, the second signaling is generated by the MAC sublayer 302.

Embodiment 2

Figure 2:
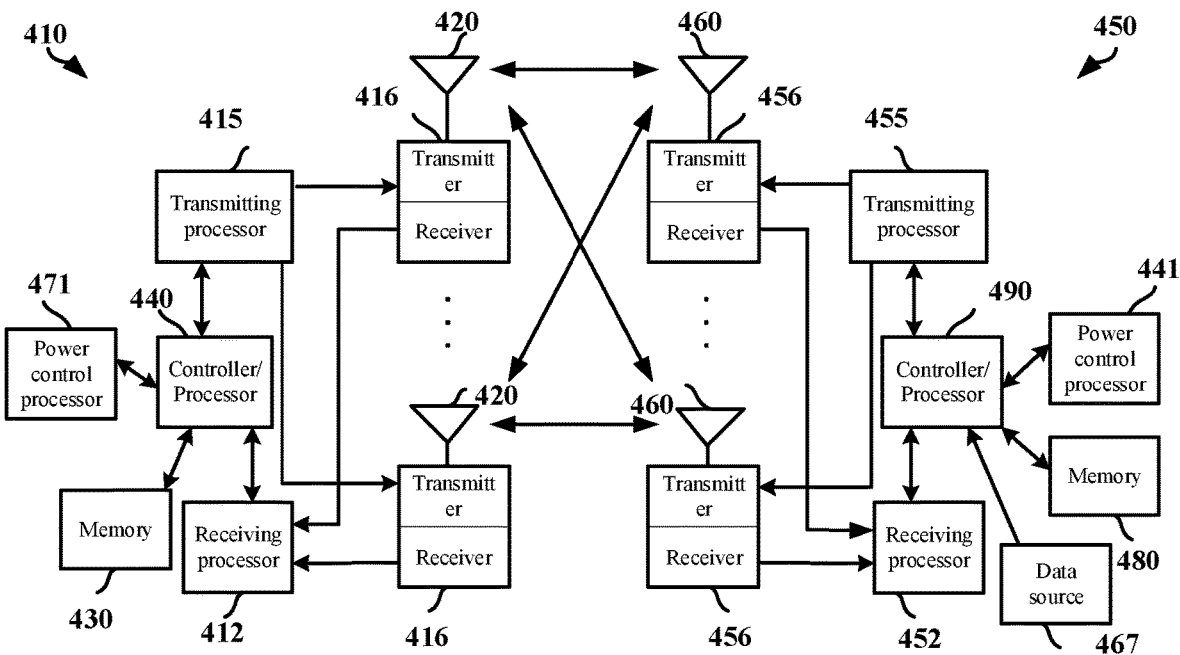
FIG. 2 is a diagram illustrating a base station equipment and a given UE according to one embodiment of the present disclosure.

Embodiment 2 is a diagram illustrating a base station equipment and a given UE according to one embodiment of the present disclosure, as FIG. 2 shown. FIG. 2 is a diagram of gNB410 between access network and UE450.

Base station (410) comprises controller/processor 440, memory 430, receiving processor 412, transmitting processor 415, power control processor 471, transmitter/receiver 416 and antenna 420.

User equipment (UE450) comprises controller/processor 490, memory 480, data source 467, transmitting processor 455, receiving processor 452, power control processor 441, transmitter/receiver 456 and antenna 460.

In downlink transmission, a processing associated with a base station device (410) comprising:

Upper layer packet arrives at controller/processor 440, controller/processor 440 provides packet head compression, encryption, packet segmented connection, reordering and multiplexing demultiplexing between logic and transport channels, to implement L2 layer protocols for user planes and control planes; upper packet may comprise data or control information, such as Downlink Shared Channel (DL-SCH);

Controller/processor 440 and stored program code are corresponding to a data memory 430. The memory 430 can be a computer readable medium;

Controller/processor 440 comprises scheduling unit to transmit demand, the scheduler unit is configured to schedule an air interface resource corresponding to the transmission requirement;

Transmit processor 415 receives an output bit stream of controller/processor 440, implement various signal transmission processing functions for the L1 layer (i.e. physical layer) comprises coding, interleaving, scrambling, modulation, power control/allocation, and physical layer control signaling (comprising PBCH, PDCCH, PHICH, PCFICH, reference signals) generation, etc.;

Power control processor 471 predicts a transmission power of data symbols, control symbols or reference signal symbols, and determine the first power control parameter and second power control parameter in the present; and results are output to a transmit processor 415 by the controller/processor 440;

Transmitter 416 is configured to convert a baseband signal provided by transmit processor 415 into a radio frequency signal and transmit it via antenna 420; each transmitter 416 samples respective input symbol streams to obtain respective sampled signal streams. Each transmitter 416 performs further processing on respective sample streams (such as digital-to-analog conversion, amplification, filtering, up-conversion, etc.) to obtain a downlink signal.

In downlink transmission, processing related to user equipment (UE 450) may comprise:

Receiver 456 is configured to convert a radio frequency signal received through antenna 460 into a baseband signal and provide a signal to receiving processor 452;

Receiving processor 452 implements various signal receiving processing functions for L1 layer (i.e., the physical layer) comprising decoding, deinterleaving, descrambling, demodulation, and physical layer control signaling extraction, etc.

Controller/processor 490 receives a bit stream output by receiving processor 452, provides packet head decompression, decryption, packet segmentation and reordering, and multiplexing and demultiplexing between logical and transport channels, to implement L2 layer protocols for user planes and control planes;

Controller/processor 490 is associated with memory 480 that stores program code and data. Memory 480 can be a computer readable medium.

In uplink transmission, a processing associated with a user equipment device (UE450) comprising:

Data source provides controller/processor 490, controller/processor 490 provides packet head compression, encryption, packet segmented connection, reordering and multiplexing demultiplexing between logic and transport channels, to implement L2 layer protocols for user planes and control planes; upper packet may comprise data or control information;

Controller/processor 490 and stored program code are corresponding to a data memory 480. The memory 490 can be a computer readable medium;

Power control processor 441 determines a transmission power of a data symbol, a control symbol or a reference signal symbol, and determine the first power and the R power value(s) in the present; and output a result to transmitting processor 455 via controller/processor 490;

Transmitting processor 455 receives an output bit stream of controller/processor 490, implement various signal transmission processing functions for the L1 layer (i.e. physical layer) comprises coding, interleaving, scrambling, modulation, power control/allocation, and physical layer control signaling generation, etc., Transmitter 456 is configured to convert a baseband signal provided by transmitting processor 455 into a radio frequency signal and transmit it via antenna 460; each transmitter 456 samples respective input symbol streams to obtain respective sampled signal streams. Each transmitter 456 performs further processing on respective sample streams (such as digital-to-analog conversion, amplification, filtering, up-conversion, etc.) to obtain a downlink signal.

In uplink transmission, processing related to base station (410) may comprise:

Receiver 416 is configured to convert a radio frequency signal received through antenna 420 into a baseband signal and provide a signal to receiving processor 412;

Receiving processor 412 implements various signal receiving processing functions for L1 layer (i.e., the physical layer) comprising decoding, deinterleaving, descrambling, demodulation, and physical layer control signaling extraction, etc.

Controller/processor 440 receives a bit stream output by receiving processor 412, provides packet head decompression, decryption, packet segmentation and reordering, and multiplexing and demultiplexing between logical and transport channels, to implement L2 layer protocols for user planes and control planes;

Controller/processor 440 is associated with memory 430 that stores program code and data. Memory 430 can be a computer readable medium.

In one subembodiment, the UE450 configuration comprises: at least one processor and at least one memory, the at least one memory comprises computer program code; the at least one memory and the computer program code are configured to be used with the at least one processor, the UE450 device at least: determining a first power and transmitting a first radio signal with the first power on a first carrier; and determining R power value(s), transmitting R low latency radio signal(s) on a second carrier with the R power value(s) respectively; the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, the UE450 configuration comprises: memory for storing computer readable instruction programs, the computer readable instruction program generates an action when executed by at least one processor, the action comprises: determining a first power and transmitting a first radio signal with the first power on a first carrier; and determining R power value(s), transmitting R low latency radio signal(s) on a second carrier with the R power value(s) respectively; the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, the gNB410 comprises: at least one processor and at least one memory, at least one processor and at least one memory, the at least one memory comprises computer program code; the at least one memory and the computer program code are configured to be used with the at least one processor, the gNB410 device at least: detecting a first radio signal on a first carrier and detecting R low latency radio signal(s) on a second carrier; the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, the gNB410 comprises: memory for storing computer readable instruction programs, the computer readable instruction program generates an action when executed by at least one processor, the action comprises: determining a first power and transmitting a first radio signal with the first power on a first carrier; and determining R power value(s), transmitting R low latency radio signal(s) on a second carrier with the R power value(s) respectively; the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, UE450 corresponds to a user equipment in the present.

In one subembodiment, gNB410 corresponds to a base station in the present.

In one subembodiment, at least two of transmitter 456, transmitting processor 455, and controller/processor 490 are configured to transmit a first radio signal with a first power on a first carrier.

In one subembodiment, at least two of transmitter 456, transmitting processor 455, and controller/processor 490 are used to transmit R low latency radio signal(s) with R power value(s) on a second carrier.

In one subembodiment, at least two of receiver 416, receiving processor 412, and controller/processor 440 are used to transmit a first radio signal with a first power on a first carrier.

In one subembodiment, at least two of receiver 416, receiving processor 412, and controller/processor 440 are used to transmit R low latency radio signal(s) with R power value(s) on a second carrier.

In one subembodiment, at least two of transmitter 456, transmitting processor 455, and controller/processor 490 are used to receive a first signaling in the present.

In one subembodiment, at least two of transmitter 456, transmitting processor 455, and controller/processor 490 are used to receive a second signaling in the present.

In one subembodiment, at least two of transmitter 416, transmitting processor 415, and controller/processor 440 are used to transmit a first signaling in the present.

In one subembodiment, at least two of transmitter 416, transmitting processor 415, and controller/processor 440 are used to transmit a second signaling in the present.

In one subembodiment, power processor 441 is used to determine a first power in the present and is used to determine R power value(s) in the present.

In one subembodiment, power processor 471 is used to determine a first signaling in the present and is used to determine a second signaling in the present.

Embodiment 3

Figure 3:
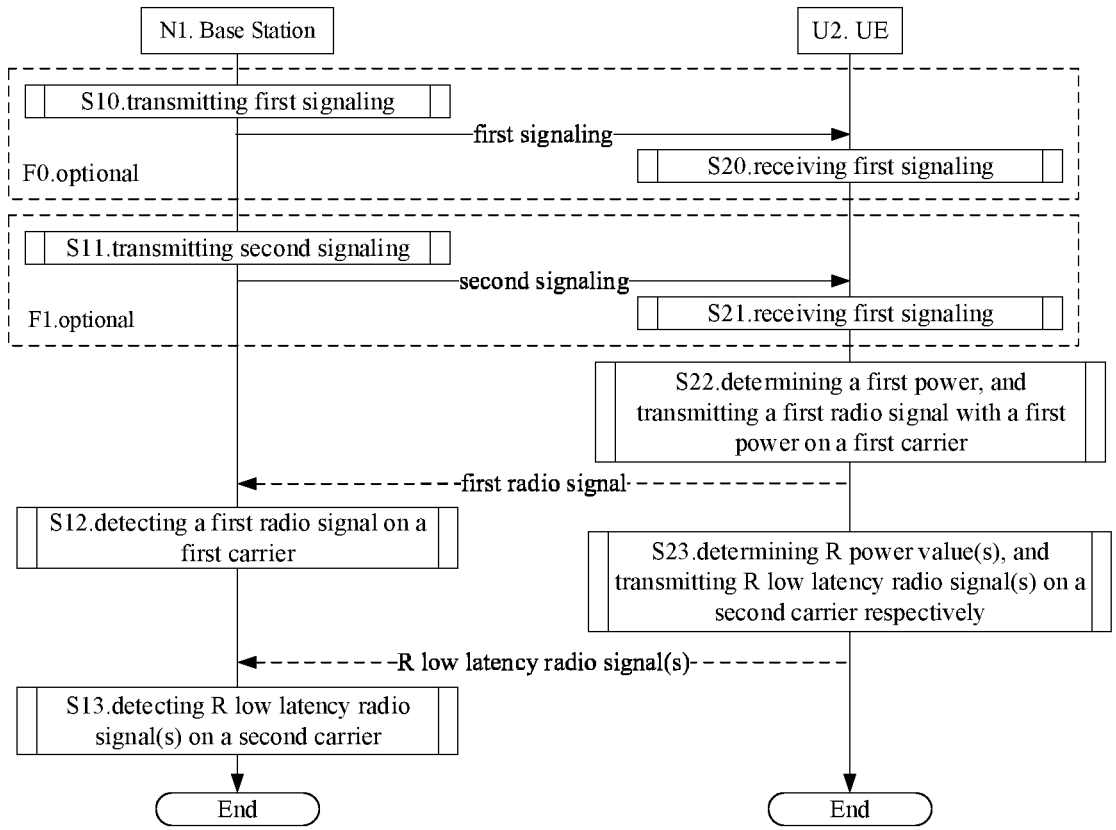
FIG. 3 is a flowchart illustrating the first radio signal and the R low latency radio signal(s) according to one embodiment of the present disclosure.

Embodiment 3 illustrates a flow chart of transmission of the first radio signal according to one of the present disclosures, as FIG. 3 shown. In FIG. 3, base station N1 is a maintenance base station of a serving cell of UE U2. Wherein steps identified in block F0 and block F1 are optional.

For base station N1, transmitting a first signaling in step S10; transmitting a second signaling in step S11; detecting a first radio signal on a first carrier in step S12; detecting R radio signal(s) on a second carrier in step S13.

For UE U2, receiving a first signaling in step S20; receiving a second signaling in step S21; determining a first power in step S22, and transmitting a first radio signal with a first power on a first carrier; determining R power value(s) in step S23; and transmitting R low latency radio signal(s) with R power value(s) on a second carrier respectively.

In embodiment 3, the first radio signal carries at least one of a first bit block and a first uplink control information; the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s). In one subembodiment, detecting a first radio signal on the first carrier is: determining the value of the first power; if the first power is greater than a given threshold value, receiving a first radio signal on a first carrier; if a first power is not less than a given threshold value, dropping a first radio signal reception on a first carrier.

In one subembodiment, detecting the R radio signal(s) on the second carrier is: determining the R power value(s) corresponding to R low latency radio signal(s); if a given power is greater than a given threshold value, receiving a low latency radio signal on a second carrier with a given power; if a given power is not less than a given threshold value, dropping a low latency radio signal reception on a second carrier.

In one subembodiment of the above two embodiments, the given threshold value is invariant or configurable.

In one subembodiment of the above two embodiments, the receiving is demodulating and decoding.

In one subembodiment of the above two embodiments, the dropping means performing demodulating or decoding.

In one subembodiment, the first signaling is a Radio Resource Control (RRC) signaling of Cell-specific.

In one subembodiment, the first signaling is a Radio Resource Control (RRC) signaling of UE-specific.

In one subembodiment, the first signaling is a Radio Resource Control (RRC) signaling of sTTI-specific.

In one subembodiment, the first information is a physical layer signaling.

In one subembodiment, the second signaling is a RRC signaling of Cell-specific.

In one subembodiment, the second signaling is a RRC signaling of UE-specific.

In one subembodiment, the second signaling is a RRC signaling of sTTI-specific.

Embodiment 4

Figure 4:
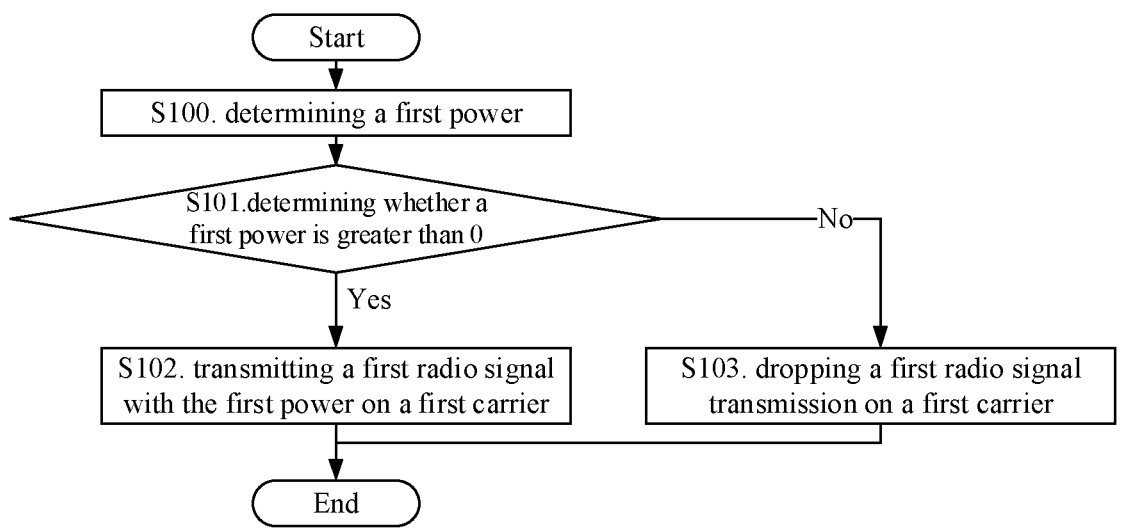
FIG. 4 is a flowchart illustrating that determine a first power and the first radio signal according to a UE side of one embodiment of the present disclosure.

Embodiment 4 illustrates a flowchart for determining the first power and the first radio signal according to a UE side of the present, as shown in FIG. 4.

In FIG. 4, a UE determines a first power in step S100. It is determined whether a first power is greater than 0 in step S101. If a first power is greater than 0, a UE transmits a first radio signal with a first power on a first carrier in step S102. If a first power is not greater than 0, a UE discards the transmission of a first radio signal on a first carrier in step S103.

In one subembodiment, all steps in FIG. 4 correspond to step S22 in FIG. 3.

Embodiment 5

Figure 5:
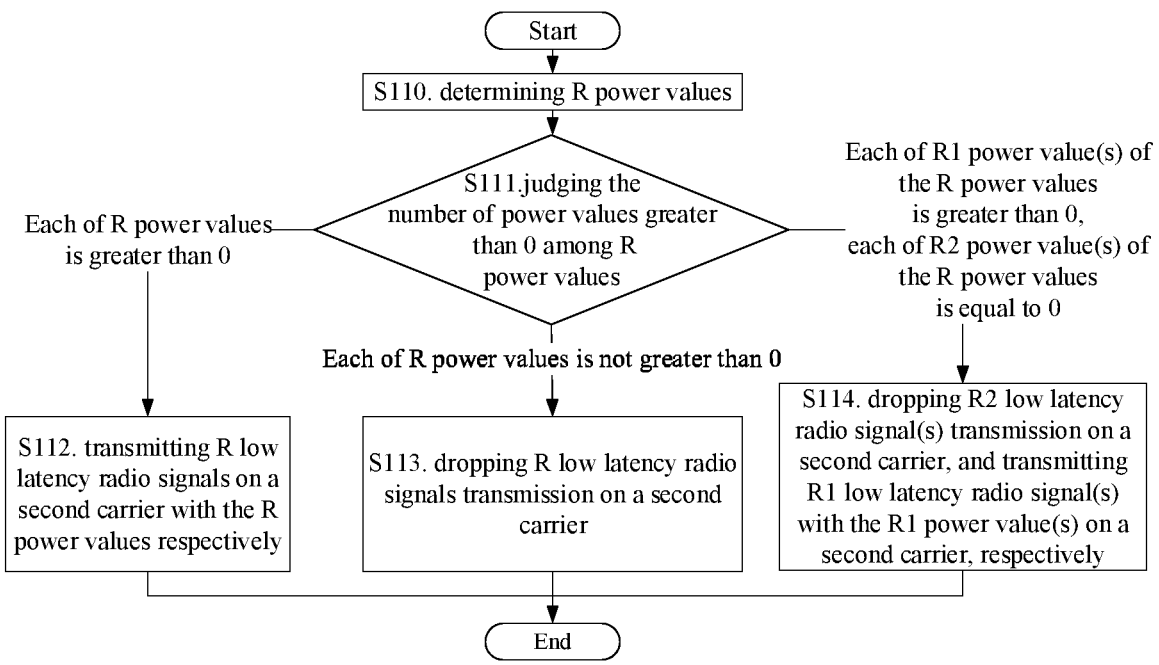
FIG. 5 is a flowchart illustrating that determine R power value(s) and the R low latency radio signal(s) according to a UE side of one embodiment of the present disclosure.

Embodiment 5 illustrates a flowchart for determining the first power and the first radio signal according to a UE side of the present, as shown in FIG. 5.

In FIG. 5, a UE determines R power value(s) in step S110. In step S111, judging the number of power value(s) greater than 0 among R power value(s). If the R power value(s) are all greater than 0, transmits R low latency radio signal(s) with R power value(s) on a second carrier in step S112. If the R power value(s) are equal to 0, dropping R low latency radio signals transmission on the second carrier in step S113. If R1 of the R power value(s) are greater than 0, R2 of the R power value(s) are equal to 0, dropping R2 low latency radio signals transmission on the second carrier in step S114, and transmitting R1 low latency radio signals with the R1 power values on a second carrier.

In one subembodiment, the R is positive integer.

In one subembodiment, the R1 and the R2 are positive integers less than the R, the R is equal to a sum of the R1 and the R2.

In one subembodiment, the R1 low latency radio signals and the R2 low delay radio signals constitute the R low latency radio signals.

In one subembodiment, all steps in FIG. 5 correspond to step S23 in FIG. 3.

Embodiment 6

Figure 6:
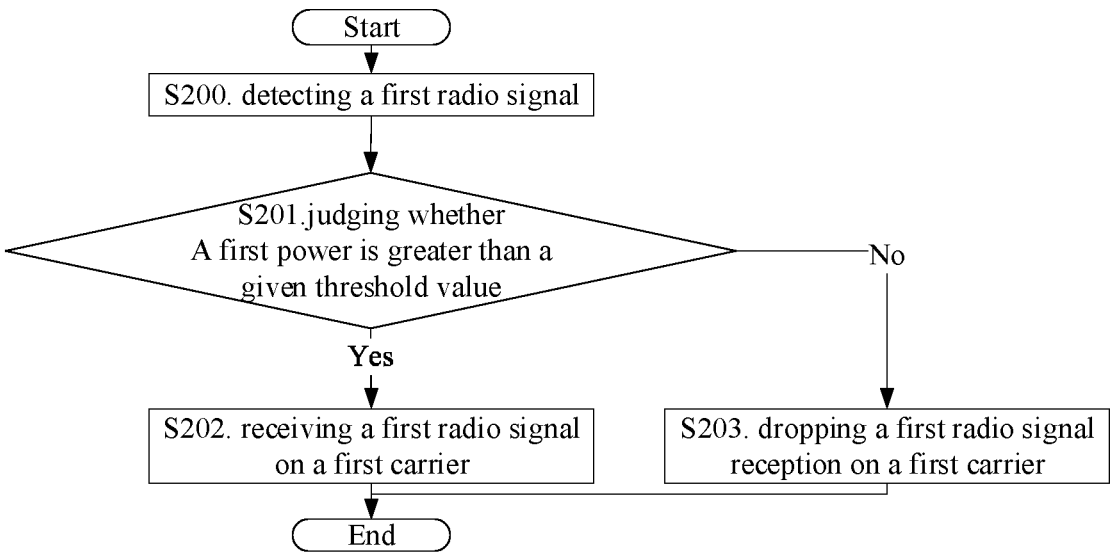
FIG. 6 is a flowchart illustrating that detect the first radio signal according to a base station side of one embodiment of the present disclosure.

Embodiment 6 illustrates a flowchart for detecting the first radio signal according to a base station side of the present, as shown in FIG. 6.

In FIG. 6, base station determines a first power in step S200. It is determined whether a first power is greater than a given threshold value in step S201. If a first power is greater than a given threshold value, base station receives a first radio signal on a first carrier in step S202. If a first power is not greater than a given threshold value, base station discards the receiving of a first radio signal on a first carrier in step S203.

In one subembodiment, all steps in FIG. 6 correspond to step S12 in FIG. 3.

In one subembodiment, the given threshold value is equal to 0.

Embodiment 7

Figure 7:
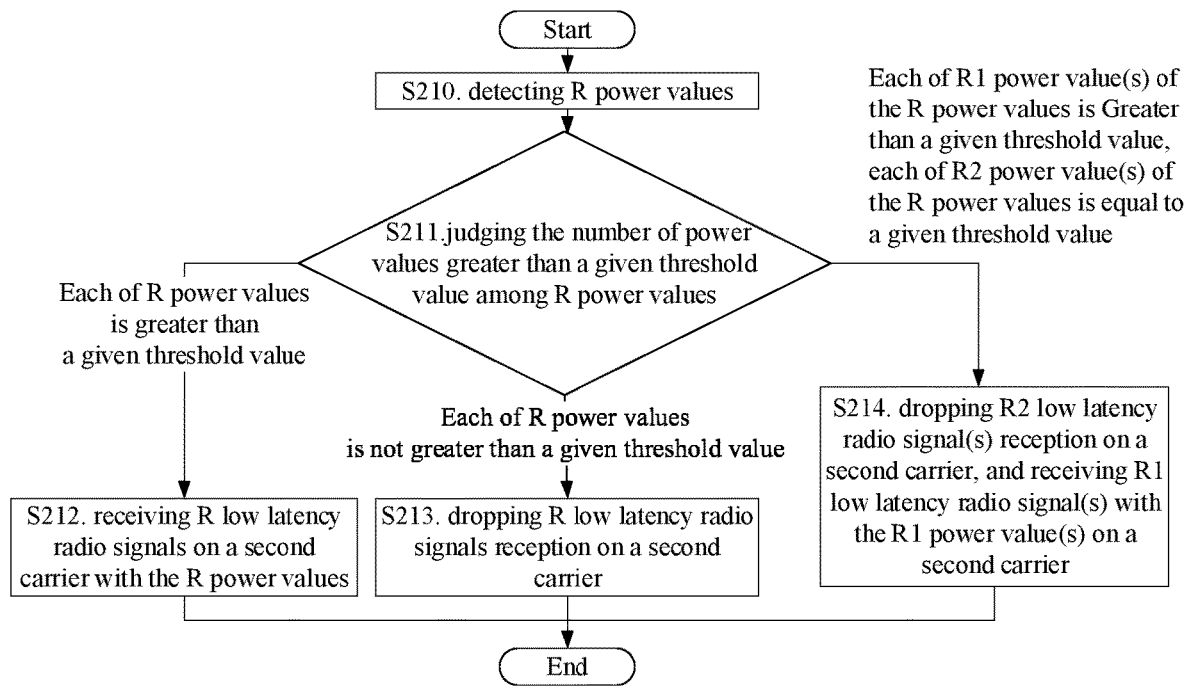
FIG. 7 is a flowchart illustrating that detect the R low latency radio signal(s) according to a base station side of one embodiment of the present disclosure.

Embodiment 7 illustrates a flowchart for detecting the R low latency radio signals according to a UE side of the present, as shown in FIG. 7.

In FIG. 7, base station determines R power value(s) in step S210. In step S211, judging the number of power value(s) greater than a given threshold value among R power value(s). If the R power value(s) are greater than a given threshold value, receives R low latency radio signal(s) with R power value(s) on a second carrier in step S212. If the R power value(s) are not greater than a given threshold value, give up receiving of R low latency radio signals on a second carrier in step S213. If R1 of the R power value(s) are greater than a given threshold value, R2 of the R power value(s) are not greater than a given threshold value, dropping R2 low latency radio signals transmission on the second carrier in step S214, and receiving R1 low latency radio signals on a second carrier.

In one subembodiment, the R is positive integer.

In one subembodiment, the R1 and the R2 are positive integers less than the R, the R is equal to a sum of the R1 and the R2.

In one subembodiment, the R1 low latency radio signals and the R2 low delay radio signals constitute the R low latency radio signals.

In one subembodiment, all steps in FIG. 7 correspond to step S13 in FIG. 3.

Embodiment 8

Figure 8:
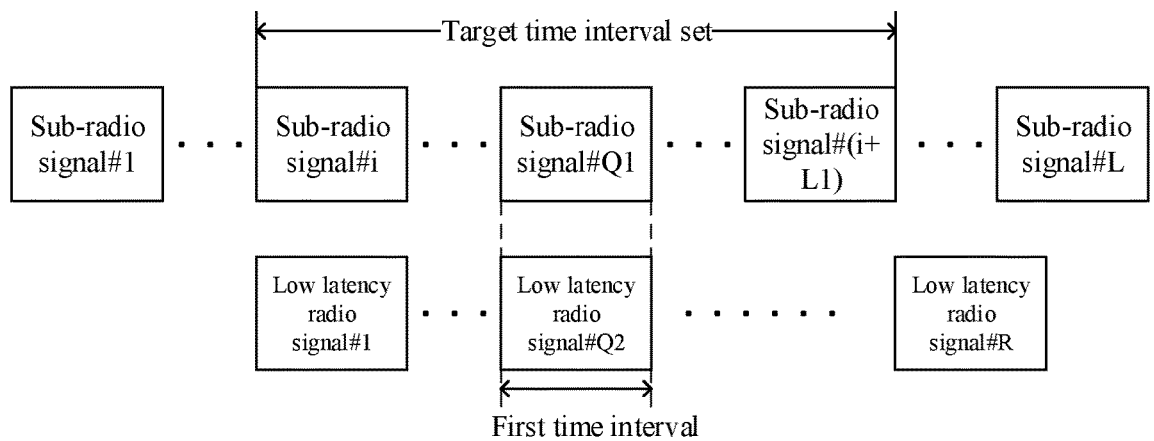
FIG. 8 is a diagram illustrating the L sub-radio signal(s) and the R low latency radio signal(s) according to one embodiment of the present disclosure.

Embodiment 8 illustrates a diagram for the L sub-radio signals and the R low latency radio signals according to the present, as shown in FIG. 8. In FIG. 8, on the first carrier, the first radio signal is composed of the L sub-radio signals, corresponding to sub-radio signal #1 to sub-radio signal #L. In the L sub-radio signals, there are L1 sub-radio signals, L1 time intervals corresponding to the L1 sub-radio signals (corresponding to sub-radio signal #i to sub-radio signal #(i+L1) in a figure) constitute a target time interval set. On the second carrier, there are the R low latency radio signals, corresponding to the R time intervals, and in the R time intervals, there is at least a first time interval, the first time interval belongs to the target time interval set. The L is a positive integer greater than 1, the i is an integer greater or equal to 1, the (i+L1) is an integer less than or equal to L, the Q1 is an integer not less than i and not greater than (i+L1), the Q2 is an integer not less than 1 and not greater than R.

In one subembodiment, the L time intervals constitute 1 ms.

In one subembodiment, the L time interval constitute a first sTTI, a given time interval in the R time intervals corresponds to a second sTTI, and a duration of the first sTTI is not less than a duration of the second sTTI. The given time interval is any one of the R time intervals.

As an example of the subembodiment, a duration of the sTTI in time-domain is equal to a duration of T consecutive multicarrier symbols. The T is equal to one of 2, 4 and 7.

In one subembodiment, the first radio signal belongs to a first carrier, and the low latency radio signal belongs to the second carrier, the first carrier and the second carrier are orthogonal in a frequency domain.

Embodiment 9

Figure 9:
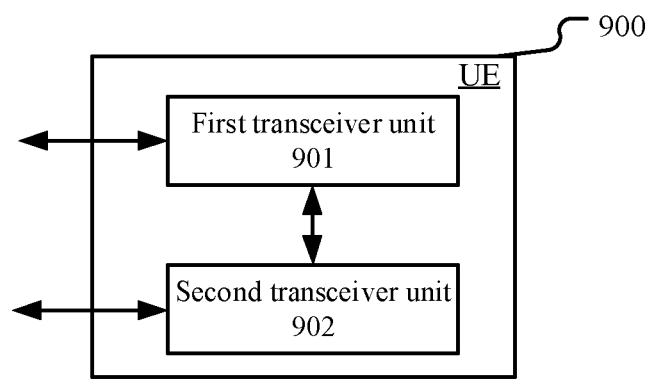
FIG. 9 is a structure block diagram illustrating a processing device in UE according to one embodiment of the present disclosure.

Embodiment 9 illustrates a block diagram for a processing device in a user equipment according to the present, as shown in FIG. 9. In FIG. 9, user equipment processing device 900 comprises a first transceiver 901 and a second transceiver 902.

A first transceiver 901, determine a first power, and transmitting the first radio signal with the first power on the first carrier A second transceiver 902, determine R power value(s), and transmitting R low latency radio signals with the R power value(s) on a second carrier.

In Embodiment 9, the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, the first transceiver 901 also receives a second signaling; the second signaling is used to determine at least one of the Q time intervals and time-frequency resources occupied by the indication information in a corresponding time interval.

In one subembodiment, the first transceiver 901 also receives a first signaling, the first signaling is used to determine a first power control parameter, the first power control parameter comprises a configuration parameter of the first ideal power.

In one subembodiment, the second transceiver 902 also receives a second signaling, the second signaling is used to determine a second power control parameter, the second power control parameter comprises a configuration parameter of the second ideal power.

In one subembodiment, at least a first time interval of the R time interval(s) belongs to the target time interval set; the first radio signal carries the first bit block and the first bit block of the first UCI, the given low latency radio signal carries the low latency UCI, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the user equipment on carrier(s) other than the first carrier and the second carrier.

In one subembodiment, at least a first time interval of the R time interval(s) belongs to the target time interval set; the first radio signal carries the first UCI, the given low latency radio signal carries the low latency UCI, the first UCI is transmitting on a physical layer data channel, the low latency UCI is transmitting on a physical layer control channel; a first power is less than or equal to a difference between a third power and a second power; the first power is equal to a first ideal power; the second power is a transmission power of the first low latency radio signal without power scaling, the first ideal power is a transmission power of the first radio signal without power scaling; the third power is a maximum total transmission power minus a fourth power, the fourth power is a total transmission power of the user equipment on carrier(s) other than the first carrier and the second carrier.

In one subembodiment, at least a first time interval of the R time interval(s) belongs to the target time interval set; the first radio signal carries the first bit block and the first bit block of the first UCI, the given low latency radio signal carries the low latency UCI, the first power is greater than a difference between a third power and a second power; the second power is a transmission power of the first low latency radio signal without power scaling, the first ideal power is a transmission power of the first radio signal; the third power is a maximum total transmission power minus a fourth power, the fourth power is a total transmission power of the user equipment on carrier(s) other than the first carrier and the second carrier.

In one subembodiment, at least a first time interval of the R time interval(s) belongs to the target time interval set; the first radio signal carries the first UCI, the given low latency radio signal carries the low latency UCI, the first UCI is transmitting on a physical layer data channel, the low latency UCI is transmitting on a physical layer control channel; a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the user equipment on carrier(s) other than the first carrier and the second carrier.

In one subembodiment, the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the UE on the first time interval on carrier(s) other than the first carrier and the second carrier.

In one subembodiment, R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises (comprise) the low latency uplink control information, the V3 low latency radio signal(s) is(are) transmitted by the physical layer data and not comprises(comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

In one subembodiment, transmitting a given radio signal with a given power is: if the given power is greater than 0, transmitting the given radio signal, a transmission power of the given radio signal is the given power; if the given power is 0, dropping the given radio signal transmission.

In one subembodiment, the first power is greater than 0, the phrase transmitting a first radio signal with a first power on a first carrier is: transmitting the first radio signal, a transmission power of the first radio signal is the first power.

In one subembodiment, the first power is equal to 0, the phrase transmitting a first radio signal with a first power on a first carrier is: dropping a first radio signal transmission on a first carrier.

In one subembodiment, the R power value(s) is(are) equal to 0, the phrase transmitting R radio signal(s) with R power value(s) on a second carrier is: dropping R low latency radio signal(s) transmission on a second carrier.

In one subembodiment, the R power value(s) is(are) greater than 0, the phrase transmitting R radio signal(s) with R power value(s) on a second carrier is: transmitting R low latency radio signal(s) with the R power value(s) on a second carrier.

In one subembodiment, R1 power value(s) of the R power value(s) are greater than 0, R2 power value(s) of the R power value(s) is(are) equal to 0, the phrase transmitting R radio signal(s) with R power value(s) on a second carrier is: dropping R low latency radio signal(s) transmission on a second carrier, transmitting R1 low latency radio signal value(s) on a second carrier, a transmission power of the R1 low latency radio signal(s) are the R1 power value(s) respectively, the R is equal to a sum of the R1 and the R2, the R1 low latency radio signal(s) and the R2 low latency radio signal(s) constitute the R low latency radio signal(s). The R1 and the R2 are positive integers less than the R, respectively.

In one subembodiment, the first transceiver 901 comprises a transmitter 456, a receiver 456, a transmitting processor 455, receiving processor 452 and a power control processor 441 in FIG. 2.

In one subembodiment, the first transceiver 901 comprises a controller/processor 490 in FIG. 2.

In one subembodiment, the second transceiver 902 comprises a transmitter 456, a receiver 456, a transmitting processor 455, receiving processor 452 and a power control processor 441 in FIG. 2.

In one subembodiment, the first transceiver 902 comprises a controller/processor 490 in FIG. 2.

Embodiment 10

Figure 10:
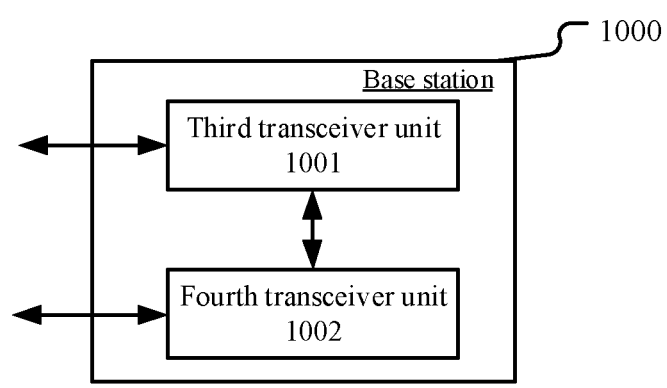
FIG. 10 is a structure block diagram illustrating a processing device in a base station according to one embodiment of the present disclosure.

Embodiment 10 illustrates a block diagram for a processing device in a base station according to the present, as shown in FIG. 10. In FIG. 10, base station processing device 1000 comprises a third transceiver 1001 and a fourth transceiver 1002.

A third transceiver 1001, detecting the first radio signal on the first carrier;

A fourth transceiver 1002, detecting R low latency radio signals on a second carrier;

In embodiment 10, the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises (comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

In one subembodiment, the third transceiver 1001 also transmits a first signaling, the first signaling is used to determine a first power control parameter, the first power control parameter comprises a configuration parameter of the first ideal power.

In one subembodiment, the fourth transceiver 1002 also transmits a second signaling, the second signaling is used to determine a second power control parameter, the second power control parameter comprises a configuration parameter of the second ideal power.

In one subembodiment, at least a first time interval of the R time interval(s) belongs to the target time interval set; the first radio signal carries the first UCI, the given low latency radio signal carries the low latency bit block and the low latency bit block in the low latency UCI; a second ideal power is less than or equal to a difference between a third power and a first power, the first power is a transmission power of the first low latency radio signal without power scaling, the second ideal power is a transmission power of the low latency radio signal without power scaling; the third power is a maximum total transmission power minus a fourth power, the fourth power is a total transmission power of the user equipment on carrier(s) other than the first carrier and the second carrier.

In one subembodiment, at least a first time interval of the R time interval(s) belongs to the target time interval set; the first radio signal carries the first UCI, the given low latency radio signal carries the low latency UCI, the first UCI is transmitted by a physical layer control channel, the low latency UCI is transmitted by a physical layer data channel; a second ideal power is less than or equal to a difference between a third power and a first power, the first power is a transmission power of the first low latency radio signal without power scaling, the second ideal power is a transmission power of the low latency radio signal without power scaling; the third power is a maximum total transmission power minus a fourth power, the fourth power is a total transmission power of the user equipment on carrier(s) other than the first carrier and the second carrier.

In one subembodiment, at least a first time interval of the R time interval(s) belongs to the target time interval set; the first radio signal carries the first UCI, the first low latency radio signal carries the low latency bit block between the low latency bit block and the low latency UCI; a second ideal power is greater than a difference between a third power and a first power, the second power is less than or equal to a difference between the third power and the first power; the first power is a transmission power of the given sub-radio signal without power scaling, the second ideal power is a transmission power of the given low latency radio signal without power scaling; the third power is a maximum total transmission power minus a fourth power, the fourth power is a total transmission power of the UE on carrier(s) other than the first carrier and the second carrier.

In one subembodiment, at least a first time interval of the R time interval(s) belongs to the target time interval set; the first radio signal carries the first UCI, the given low latency radio signal carries the low latency UCI, the first UCI is transmitted by a physical layer control channel, the low latency UCI is transmitted by a physical layer data channel; a second ideal power is greater than a difference between a third power and a first power, the second power is less than or equal to a difference between the third power and the first power; the first power is a transmission power of the first low latency radio signal without power scaling, the second ideal power is a transmission power of the low latency radio signal without power scaling; the third power is a maximum total transmission power minus a fourth power, the fourth power is a total transmission power of the user equipment on carrier(s) other than the first carrier and the second carrier.

In one subembodiment, R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises (comprise) the low latency uplink control information, the V3 low latency radio signal(s) is(are) transmitted by the physical layer data and not comprises(comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

In one subembodiment, the third transceiver 1001 comprises a transmitter 416, a receiver 416, a transmitting processor 415, receiving processor 412 and a power control processor 471 in FIG. 2.

In one subembodiment, the third transceiver 1001 comprises a controller/processor 440 in FIG. 2.

In one subembodiment, the fourth transceiver 1002 comprises a transmitter 416, a receiver 416, a transmitting processor 415, receiving processor 412 and a power control processor 471 in FIG. 2.

In one subembodiment, the first transceiver 1002 comprises a controller/processor 440 in FIG. 2.

The ordinary skill in the art may understand that all or part steps in the above method may be implemented by instructing related hardware through a program. The program may be stored in a computer-readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, tablet computers, notebooks, cars with a communication module, wireless sensors, network cards, Internet of Things terminals, RFID terminals, narrowband Internet of Things (NB-IOT) terminals, Machine Type Communication (MTC) terminals, eMTC terminals, data cards, network cards, cars with a communication module, low cost mobile phones, low cost tablet computers, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for low latency communication, comprising:

determining a first power and transmitting a first radio signal with the first power on a first carrier;

determining R power value(s), transmitting R low latency radio signal(s) on a second carrier with the R power value(s) respectively;

wherein the first radio signal carries at least one of a first bit block and a first uplink control information; the first radio signal comprises L sub-radio signals, the L sub-radio signals occupies L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and a low latency uplink channel; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a transmission power of the first low latency radio signal is a second power, the first power is used to determine the second power or the second power is used to determine the first power, time-domain resources occupied by the first low latency radio signal belong to a first time interval; or the R time interval(s) are out of the target time interval set, the first power is used to determine the R power value(s); the first time interval is one of the R time interval(s).

2. The method according to claim 1, wherein at least the first time interval of the R time interval(s) belongs to the target time interval set; the first radio signal carries the first bit block between the first bit block and the first uplink control information, the first low latency radio signal carries the low latency uplink control information; or the first radio signal carries the first uplink control information, the first low latency radio signal carries the low latency uplink control information, the first uplink control information is transmitted by physical layer data channel, the low latency uplink control information is transmitted by physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the user equipment on the first time interval on carrier(s) other than the first carrier and the second carrier;

or, at least the first time interval of the R time interval(s) belongs to the target time interval set; the first radio signal carries the first uplink control information, the first low latency radio signal carries the low latency bit block between the low latency bit block and the low latency uplink control information; or the first radio carries the first uplink control information, the first low latency radio signal carries the low latency uplink control information, the first uplink control information is transmitted by physical layer data channel, the low latency uplink control information is transmitted by physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the user equipment on the first time interval on carrier(s) other than the first carrier and the second carrier;

or, at least a first time interval of the R time interval(s) belongs to the target time interval set; the first radio signal carries the first bit block between the first bit block and the first uplink control information; the first low latency radio signal carries the low latency bit block between the low latency bit block and the low latency uplink control information; or the first radio signal carries the first uplink control information, the first low latency radio signal carries the low latency uplink control information, the first uplink control information is transmitted by physical layer control channel, the low latency uplink control information is transmitted by physical layer control channel; or the first radio signal carries a first uplink control information, the first low latency radio signal carries the low latency uplink control information, the first uplink control information is transmitted by physical layer data channel, the low latency uplink control channel is transmitted by physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than or, the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the user equipment on the first time interval on carrier(s) other than the first carrier and the second carrier.

3. The method according to claim 2, wherein R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non-negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted on the physical layer data and not comprises (comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

4. The method according to claim 2, comprising:
receiving a first signaling, the first signaling is used to determine a first power control parameter, the first power control parameter comprises a configuration parameter of the first ideal power;
or, receiving a second signaling, the second signaling is used to determine a second power control parameter, the second power control parameter comprises a configuration parameter of the second ideal power;
or, receiving a first signaling and receiving a second signaling, the first signaling is used to determine a first power control parameter, the first power control parameter comprises a configuration parameter of the first ideal power, the second signaling is used to determine a second power control parameter, the second power control parameter comprises a configuration parameter of the second ideal power.

5. A user equipment for low latency communication, comprising:
a first transceiver, determining a first power, and transmitting a first radio signal on a first carrier;
a second transceiver, determining R power value(s), and transmitting R low latency radio signal(s) on a second carrier respectively;
wherein the first radio signal carries at least one of a first bit block and a first uplink control information; the first radio signal comprises L sub-radio signals, the L sub-radio signals occupy L time intervals respectively, the L is a positive integer greater than 1; time-domain resources occupied by the R low latency radio signal(s) belong to R time interval(s) respectively, the R time interval(s) is(are) R of the L time intervals, the R is a positive integer; each of the R low latency radio signal(s) carries at least one of a low latency bit block and low latency uplink control information; a target time interval set is composed by L1 time interval(s), the L1 time interval(s) is(are) L1 of the L time intervals, the L1 is a positive integer less than or equal to the L; at least a first time interval of the R time interval(s) belongs to the target time interval set, the R low latency radio signal(s) comprises(comprise) a first low latency radio signal, a receiving power of the first low latency radio signal is a second power, the first power is used to determine the second power or the second power is used to determine the first power, time-domain resources occupied by the first low latency radio signal belong to a first time interval; or the R time interval(s) is(are) out of the target time interval set, the first power is used to determine the R power value(s); the first time interval is one of the R time interval(s).

6. The user equipment according to claim 5, wherein at least the first time interval of the R time interval(s) belongs to the target time interval set; the first radio signal carries the first bit block between the first bit block and the first uplink control information, the first low latency radio signal carries the low latency uplink control information; or the first radio signal carries the first uplink control information, the first low latency radio signal carries the low latency uplink control information, the first uplink control information is transmitted by physical layer data channel, the low latency uplink control information is transmitted by physical layer control channel; a first ideal power is less than or equal to a difference between a third power and a second power, the first power is equal to the first ideal power; or a first ideal power is greater than a difference between a third power and a second power, the first power is less than or equal to a difference between a third power and a second power; the second power is a transmission power of the first low latency radio signal without power scaling, the first ideal power is a transmission power of the first radio signal without power scaling; the third power is a maximum total transmission power minus a fourth power, the fourth power is a total transmission power of the user equipment on the first time interval on carrier(s) other than the first carrier and the second carrier.

7. The user equipment according to claim 6, wherein R3 low latency radio signal(s) comprises(comprise) time-domain resources occupied by R low latency radio signal(s) belong to the target time interval set, the R3 is a positive integer; the R3 low latency radio signal(s) is(are) comprised of the V1 low latency radio signal(s), the V2 low latency radio signal(s) and the V3 low latency radio signal(s); the V1, V2, V3 are non- negative integers respectively; a sum of the V1, the V2 and the V3 is equal to the R3; the V1 low latency radio signal(s) is(are) transmitted by physical layer control channel(s) respectively, the V2 low latency radio signal(s) is(are) transmitted by physical layer data channel(s) respectively and comprises(comprise) the low latency uplink control information, the V3 low latency radio signal(s) is(are) transmitted on the physical layer data and not comprises(comprise) the low latency uplink control information; the V1 is greater than 0, the first low latency radio signal is a low latency radio signal with a maximum transmission power in the V1 low latency radio signal(s) without power scaling; or the V1 is equal to 0 and the V2 is greater than 0, the first low latency radio signal is a low latency radio signal with a maximum transmission power in the V2 low latency radio signals without power scaling; or the V1 and the V2 are both 0, the first low latency radio signal is a low latency radio signal with a maximum transmission power in the V3 low latency radio signals without power scaling.

8. The user equipment according to claim 6, wherein the first transceiver also receives a first signaling, the first signaling is used to determine a first power control parameter, the first power control parameter comprises a configuration parameter of the first ideal power.

9. The user equipment according to claim 5, wherein at least the first time interval of the R time interval(s) belongs to the target time interval set; the first radio signal carries the first uplink control information, the first low latency radio signal carries the low latency bit block between the low latency bit block and the low latency uplink control information; or the first radio carries the first uplink control information, the first low latency radio signal carries the low latency uplink control information, the first uplink control information is transmitted by physical layer data channel, the low latency uplink control information is transmitted by physical layer data channel; a second ideal power is less than or equal to a difference between a third power and a first power, the second power is equal to the second ideal power; or a second ideal power is greater than a difference between a third power and a first power, the second power is less than or equal to a difference between a third power and a first power; the first power is a transmission power of the first radio signal without power scaling, the second ideal power is a transmission power of the first low latency radio signal without power scaling; the third power is a maximum total transmission power minus a fourth power, the fourth power is a total transmission power of the user equipment on the first time interval on carrier(s) other than the first carrier and the second carrier.

10. The user equipment according to claim 9, wherein the second transceiver also receives a second signaling, the second signaling is used to determine a second power control parameter, the second power control parameter comprises a configuration parameter of the second ideal power.

11. The user equipment according to claim 5, at least a first time interval of the R time interval(s) belongs to the target time interval set; the first radio signal carries the first bit block between the first bit block and the first uplink control information; the first low latency radio signal carries the low latency bit block between the low latency bit block and the low latency uplink control information; or the first radio signal carries the first uplink control information, the first low latency radio signal carries the low latency uplink control information, the first uplink control information is transmitted by physical layer control channel, the low latency uplink control information is transmitted by physical layer control channel; or the first radio signal carries a first uplink control information, the first low latency radio signal carries the low latency uplink control information, the first uplink control information is transmitted by physical layer data channel, the low latency uplink control channel is transmitted by physical layer data channel; a sum of a first ideal power and a second ideal power is less than or equal to a third power, the first power is equal to a first ideal power, the second power is equal to a second ideal power; or a sum of a first ideal power and a second ideal power is greater than a third power, the first power is equal to a product of a first ideal power and a scaling factor, the second power is equal to a product of a second ideal power and the scaling factor; the first ideal power is a transmission power of the given sub-radio signal without power scaling, the second ideal power is a transmission power of the given low latency radio signal without power scaling, the scaling factor is not less than 0 and not greater than 1.

12. The user equipment according to claim 5, wherein the R time interval(s) is(are) out of the target time interval set, the first power is equal to a first ideal power, the first ideal power is a transmission power of the first radio signal without power scaling; the R power value(s) is(are) less or equal to a difference between a third power and a first power; the third power is a maximum total transmission power minus a fourth power, the fourth power is a total transmission power of the user equipment on the first time interval on carrier(s) other than the first carrier and the second carrier.

* * * * *